(12) United States Patent
Koki et al.

(10) Patent No.: US 12,299,190 B2
(45) Date of Patent: May 13, 2025

(54) DYNAMICALLY RECONFIGURING A DISPLAY IN A MULTI-DISPLAY DEVICE

(71) Applicant: Intel Corporation, Santa Clara, CA (US)

(72) Inventors: Tarakesava Reddy Koki, Telengana (IN); Praveen Kashyap Ananta Bhat, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 922 days.

(21) Appl. No.: 17/133,735

(22) Filed: Dec. 24, 2020

(65) Prior Publication Data

US 2021/0149485 A1 May 20, 2021

(51) Int. Cl.
 *G06F 3/01* (2006.01)
 *G06F 1/16* (2006.01)
 (Continued)

(52) U.S. Cl.
 CPC ............ *G06F 3/013* (2013.01); *G06F 1/1647* (2013.01); *G06F 1/1681* (2013.01);
 (Continued)

(58) Field of Classification Search
 CPC .... G06F 1/1601; G06F 1/1647; G06F 1/1681; G06F 1/1686; G06F 1/3218; G06F 3/012; G06F 3/013; G06F 3/03545; G06F 3/0412; G06F 3/0418; G06F 3/1423; G06F 1/1616; G06F 1/1615; G06F 1/1618; G06F 1/1641; G06F 1/1677; G06F 1/1692; G06F 1/1694; G06F 1/32; G06F 3/011; G06F 3/017; G06F 3/04186; G06F 3/048;
 (Continued)

(56) References Cited

U.S. PATENT DOCUMENTS 10,747,264 B1   8/2020  Knoppert et al.
11,372,446 B2 * 6/2022  Wi ........................ G06F 3/0482
(Continued)

FOREIGN PATENT DOCUMENTS

CN   114675709 A   6/2022
EP    4020137 A1   6/2022

OTHER PUBLICATIONS

European Extended Search Report issued in EP Application No. 21 196 785.6 on Feb. 18, 2022; 8 pages.

*Primary Examiner* — Nelson M Rosario
(74) *Attorney, Agent, or Firm* — Banner & Witcoff Ltd.

(57) ABSTRACT

Particular embodiments described herein provide for an electronic device having at least two displays, the electronic device including a first housing, where the first housing includes a primary display having a first display configuration, a second housing, where the second housing includes a secondary display having a second display configuration, a camera to monitor at least one of a head position of a user and eyes of the user, at least one secondary sensor to collect user related data, user tracking logic to determine an intent of the user based on the head position of the user, the eyes of the user, and/or the user related data from the at least one secondary sensor, and display adjustment logic to change the first display configuration and/or the second display configuration when the intent of the user changes.

20 Claims, 17 Drawing Sheets

(51) Int. Cl.
*G06F 1/3218* (2019.01)
*G06F 3/0354* (2013.01)
*G06F 3/041* (2006.01)

(52) U.S. Cl.
CPC .......... *G06F 1/1686* (2013.01); *G06F 1/3218* (2013.01); *G06F 3/012* (2013.01); *G06F 3/03545* (2013.01); *G06F 3/0418* (2013.01)

(58) Field of Classification Search
CPC .. G06F 3/0487; G06F 3/04883; G06F 3/1446; G06F 9/4401; G06F 9/4411; G06F 9/445; G06F 9/44505; G06F 9/451; G06F 1/1643; G06F 2200/1637; G06F 2203/04803; G06F 3/041; G09G 5/003; G09G 5/14; G09G 2320/0626; G09G 2320/0686; G09G 2330/021; G09G 2330/022; G09G 2340/0407; G09G 2354/00; G09G 2356/00; G09G 2360/144; G09G 2370/022; G06V 10/96; G06V 30/1423; G06V 30/347; G06V 30/36; G06V 40/30; Y02D 10/00
See application file for complete search history.

(56) References Cited

U.S. PATENT DOCUMENTS

| | | | | |
|---|---|---|---|---|
| 2014/0101578 A1* | 4/2014 | Kwak | .................... | G06F 3/017 |
| | | | | 715/761 |
| 2018/0284876 A1* | 10/2018 | Ray | ...................... | H04N 7/0127 |
| 2023/0152966 A1* | 5/2023 | Kim | .................. | G06F 3/04886 |
| | | | | 345/173 |

* cited by examiner

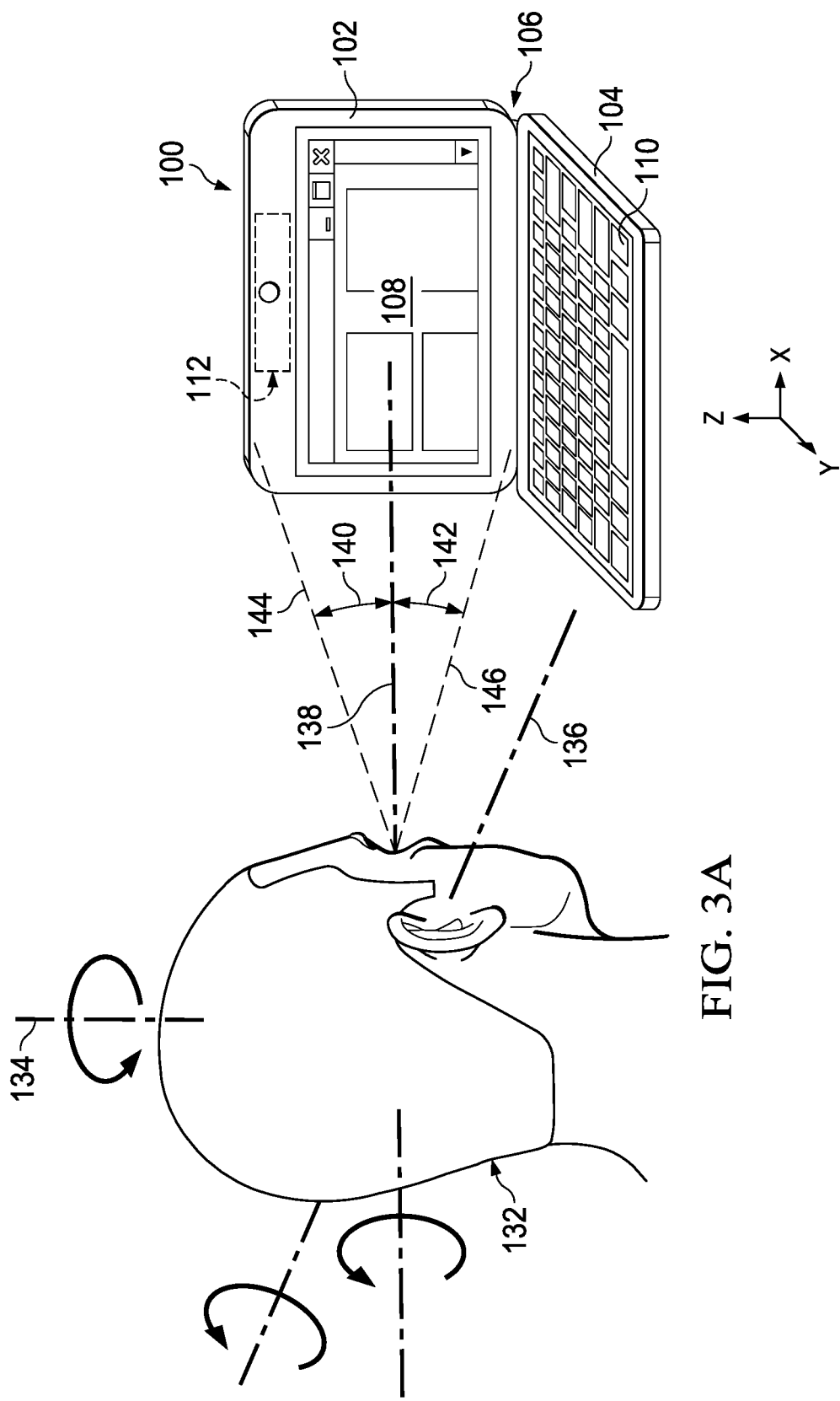

DYNAMICALLY RECONFIGURING A DISPLAY IN A MULTI-DISPLAY DEVICE

TECHNICAL FIELD

This disclosure relates in general to the field of computing, and more particularly, to a system and method for dynamically reconfiguring a display in a multi-display device.

BACKGROUND

End users have more electronic device choices than ever before. A number of prominent technological trends are currently afoot and these trends are changing the electronic device landscape. Some of the technological trends involve clamshell devices. Generally, clamshell devices are devices where a first housing is rotatably coupled to a second housing. For example, a laptop, notebook computer, etc., is a small, portable personal computer with a clamshell form factor typically having a computer display mounted on the inside of an upper first housing of the clamshell and an alphanumeric keyboard on the inside of a lower second housing of the clamshell. The clamshell device is opened to use the device and folded shut for transportation or storage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A is a simplified block diagram of a portion of a system to enable a system and method for dynamically reconfiguring a display in a multi-display device, in accordance with an embodiment of the present disclosure;

Figure 1A:
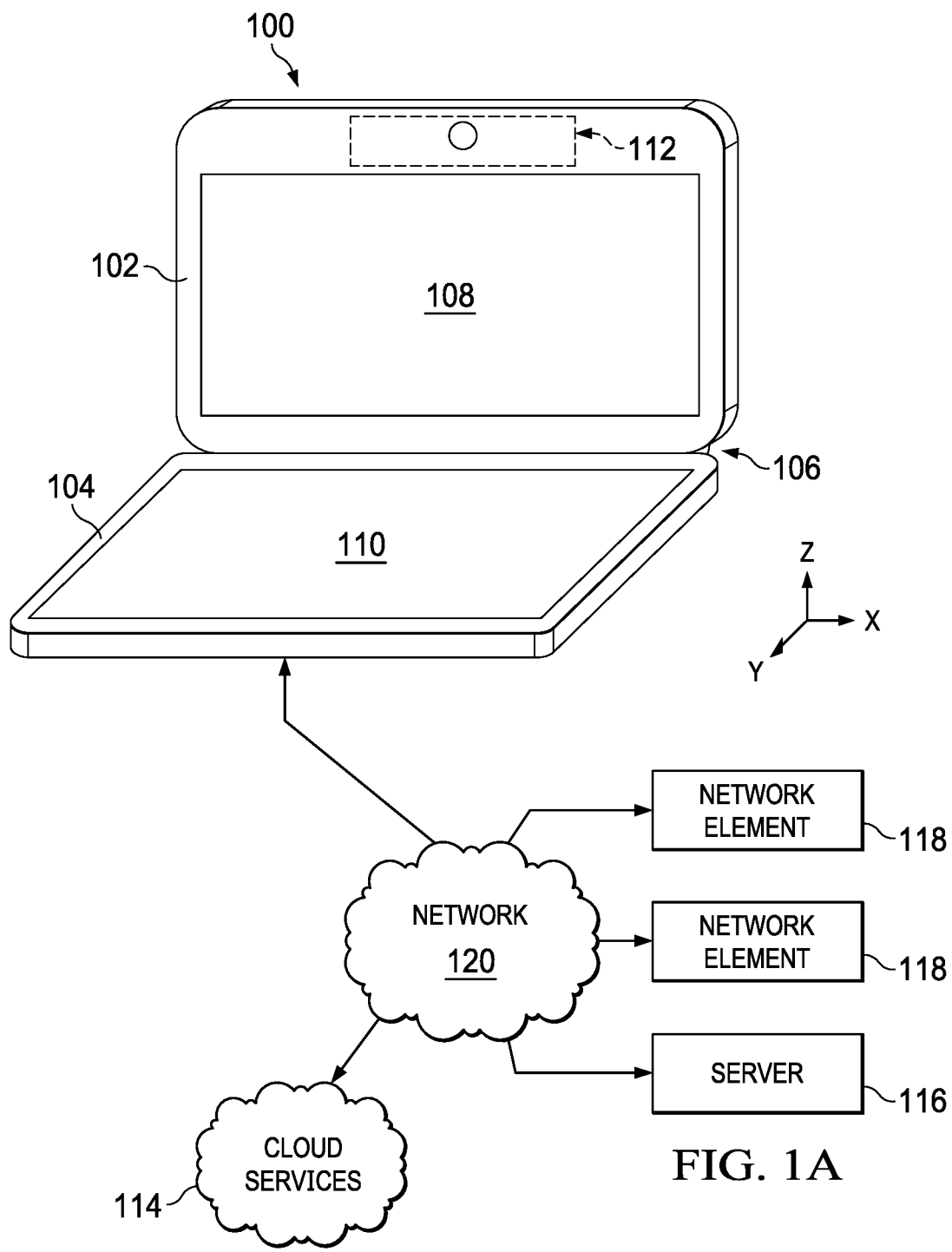
FIG. 1A is a simplified block diagram of a system to enable a system and method for dynamically reconfiguring a display in a multi-display device, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a system and method for dynamically reconfiguring a display in a multi-display device in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration, embodiments in which the subject matter of the present disclosure may be practiced. It is to be understood that other embodiments may be utilized and structural or logical changes may be made without departing from the scope of the present disclosure.

Therefore, the following detailed description is not to be taken in a limiting sense, and the scope of embodiments is defined by the appended claims and their equivalents. For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. The description may use the phrase "in an example," which may each refer to one or more of the same or different examples. Furthermore, the terms "comprising," "including," "having," and the like, as used with respect to embodiments of the present disclosure, are synonymous.

The term "coupled with," along with its derivatives, may be used herein. The term "coupled" may mean one or more of the following. The term "coupled" may mean that two or more elements are in direct physical or electrical contact. However, the term "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact. The term "about" indicates a tolerance of five percent (5%). For example, about forty-five degrees (45°) would include forty-five degrees (45°) and ±2.25 degrees (2.25°) from forty-five degrees (45°).

FIG. 1A is a simplified block diagram of an electronic device configured to enable a system and method for dynamically reconfiguring a display in a multi-display device, in accordance with an embodiment of the present disclosure. In an example, electronic device 100 can include a first housing 102 and a second housing 104. First housing 102 can be pivotably coupled to second housing 104 using a hinge 106. First housing 102 can include a primary display 108 and a camera 112. Second housing 104 can include a secondary display 110. In some examples, secondary display is a touch display. Electronic device 100 may be in communication with cloud services 114, server 116, and/or network elements 118 using network 120.

Figure 1B:
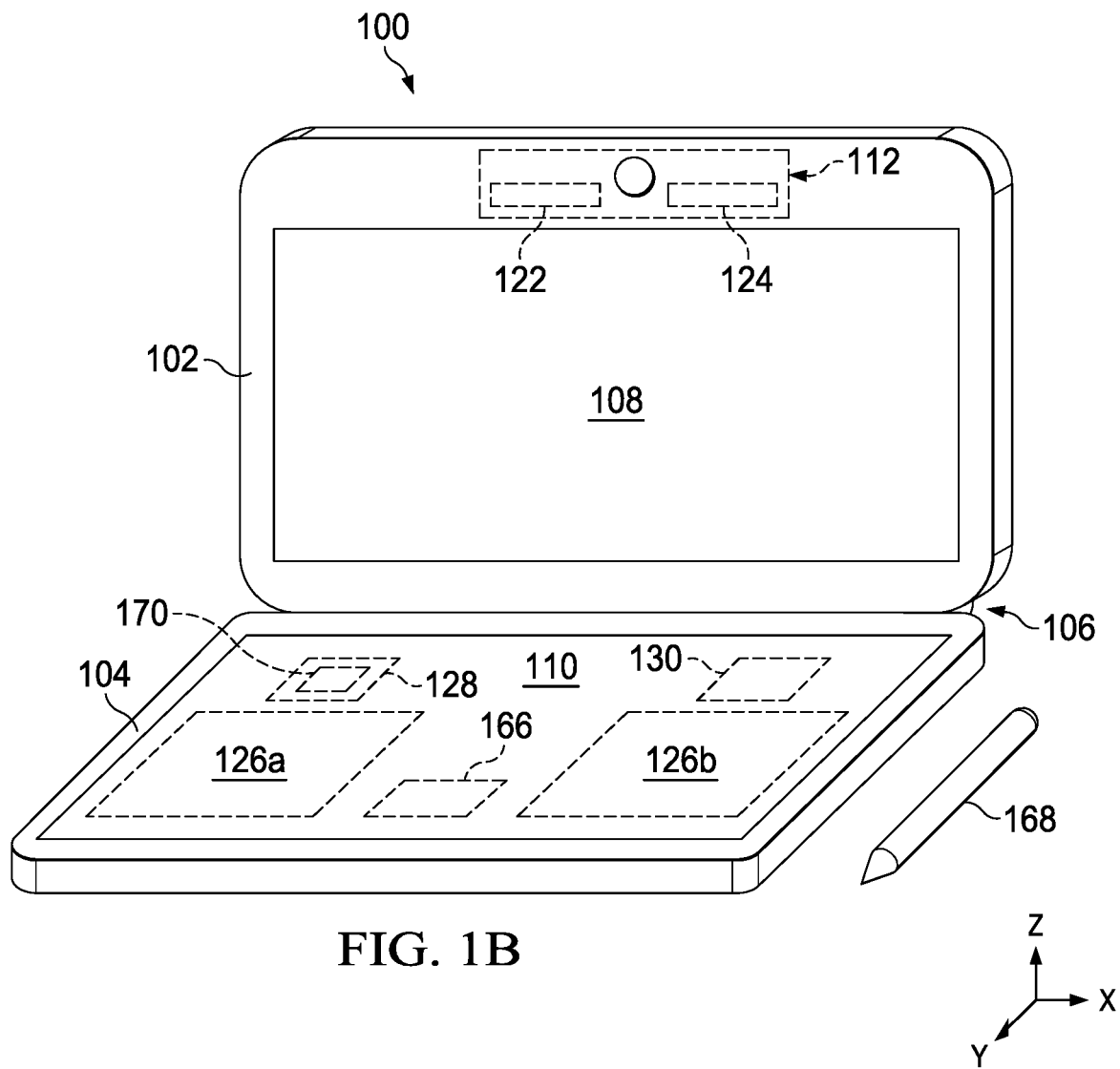
FIG. 1B is a simplified block diagram of a system to enable a system and method for dynamically reconfiguring a display in a multi-display device, in accordance with an embodiment of the present disclosure.

Turning to FIG. 1B, FIG. 1B is a simplified block diagram of electronic device 100 configured to enable a system and method for dynamically reconfiguring a display in a multi-display device, in accordance with an embodiment of the present disclosure. In an example, electronic device 100 can include first housing 102 and second housing 104. Electronic device 100 can further include hinge 106 which pivotably couples first housing 102 to second housing 104. First housing 102 can include primary display 108 and camera 112. Second housing 104 can include secondary display 110.

In an example, camera 112 can include a head position tracking sensor 122 and an eye tracking system 124. Head position tracking sensor 122 can be a low power inferred heat position tracking sensor and eye tracking system 124 can capture the user's eye(s) position and eye(s) movement to track the user's eye(s). In some examples, camera 112 can include an image sensor to capture images or video of the user. In some embodiments, the captured images or video can include the upper torso or head of the user and eye tracking system 124 may include head and/or eye tracking software to determine the direction that the user is looking. In some embodiments, eye tracking system 124 can include both head and eye tracking software for coarse and fine tracking of where the user is looking and head position tracking sensor 122 is not present in electronic device 100. Second housing 104 can include touch sensors 126a and 126b, user tracking logic 128, display reconfiguration engine 130, and peripheral detection engine 166. User tracking logic 128 can include a secondary sensor 170. In some examples, user tracking logic 128 and/or display reconfiguration engine 130 may be located in first housing 102. Secondary sensor 170 can receive and collect user related data from touch sensors 126a and 126b and peripheral detection engine 166. User tracking logic 128 can use data from head position tracking sensor 122, eye tracking system 124, and the user related data from secondary sensor 170 to determine an intent of the user. Eye tracking system 124, user tracking logic 128, display reconfiguration engine 130, peripheral detection engine 166, and/or secondary sensor 170, can be software or logic to be run on one or more processors within electronic device 100. Head position tracking sensor may be a combination of hardware and software or may be software to be run on one or more processors within electronic device 100.

Peripheral detection engine 166 can detect when a peripheral 168 is being used to interact with electronic device 100 and when the user is interacting with peripheral 168. For example, as illustrated in FIG. 1B, peripheral 168 may be a peripheral 168 being used to interact with primary display 108 and/or secondary display 110. In addition, the user may pick up, turn on, activate, or otherwise interact with peripheral 168 before interacting with primary display 108 and/or secondary display 110. More specifically, peripheral 168 may be a stylus and peripheral detection engine 166 can detect when peripheral 168 being used to interact with primary display 108 and/or secondary display 110 or, to try an obtain a faster response, peripheral detection engine 166 can detect when the user interacts with peripheral 168 in anticipation of peripheral 168 being used to interact with primary display 108 and/or secondary display 110. Peripheral 168 is a peripheral input device and/or output device used to interact with primary display 108 and/or secondary display 110 (e.g., headphones, microphone, mouse, trackpad, image scanner, etc.).

Camera 112 can be configured to include software to allow the head position of a user, the face of the user, and/or an eye or eyes of the user to be tracked or can collect data that can be used by electronic device 100 to track the head position of a user, the face of the user, and/or an eye or eyes of the user. More specifically, head position tracking sensor 122 can be configured to help detect the head position of the user and eye tracking system 124 can be configured to help detect the eye or eyes of the user. In some examples, head position tracking sensor 122 is an infrared (IR) sensor or some other relatively lower power head position tracking sensor that uses less power than eye tracking system 124. Secondary display 110 can be a touch display. Electronic device 100 can include a peripheral detection engine 166 configured to detect whether one or more palms or fingers of the user are touching the touch display. In another embodiment, electronic device 100 can include one or more touch sensors 126a and 126b on secondary display 110. In some examples, one or more touch sensors 126a and 126b can be disposed near an edge of secondary display 110. Touch sensors 126a and 126b can be configured to detect the presence of the user's palms or hands. For example, one or more touch sensors 126a and 126b may be disposed where a user would normally place their palms when typing on a virtual keyboard displayed on secondary display 110. Peripheral detection engine 166, is configured to determine when peripheral 168 is being used to interact with primary display 108 and/or secondary display 110.

User tracking logic 128 can be configured to use camera 112, head position tracking sensor 122, and/or eye tracking system 124, to help determine a head position of the user, a location of the face of the user, a location of an eye or eyes of the user, determine a gaze of the user, and/or other features of a user. Peripheral detection engine 166 can be used to supply supplemental information to user tracking logic 128 to determine the intent of the user, the head position of the user, the location of the face of the user, the location of an eye or eyes of the user, determine the gaze of the user, and/or other features of a user. The term "gaze" refers to a position of the head of the user relative to primary display 108, a position of the user's eyes relative to primary display 108, a pupil orientation relative to primary display 108, and/or a relative distance of the user's face and eyes from primary display 108. User tracking logic 128 can determine the user's intent based on the detected user's head position, palm position, face, eyes, the user related data from secondary sensor 170 and/or other features of the user. User tracking logic 128 can determine the gaze of the user and if the user is looking at primary display 108, secondary display 110, or towards some other area (e.g., to a person standing next to electronic device 100 or something in the distance and past or above electronic device 100 like a window or television device).

User tracking logic 128 can communicate data about the intent of the user (e.g., relative head position, relative face position, relative eye position, etc. to primary display 108, palm position, the user's interaction with a peripheral, etc.) to display reconfiguration engine 130. Display reconfiguration engine 130 can be configured to receive the data about the intent of the user from user tracking logic 128 and determine if the configuration of primary display 108 and/or secondary display 110 should be changed. If the configuration of primary display 108 and/or secondary display 110 should be changed, then display reconfiguration engine 130 can change the configuration of primary display 108 and/or secondary display 110. In some examples, the change in configuration is a change from a first user interface configuration (e.g., a keyboard user interface configuration) to a different second user interface configuration (e.g., a notetaking user interface configuration).

In an illustrative example, a user may be looking at secondary display 110 in a note taking configuration and taking notes and then looks at primary display 108 to use an Internet browsing application and tries to use a touchpad on secondary display 110 to move a cursor on primary display 108 or to type content into primary display 108 using secondary display 110. However, in some current systems, the current systems do not know that the user has started looking at primary display 108 and secondary display 110 does not change configuration from a note taking configuration to a keyboard and touchpad configuration and continues to be in the note taking configuration. This can result in a bad user experience.

Another issue with current systems is when the user continuously looks at primary display 108 and is not using secondary display 110 but secondary display 110 continues to display content and consume power. This can cause unnecessary power loss and reduces battery life. User tracking logic 128 can detect the user's head position, palm position, face, eyes, and/or other features of the user, and based on the data from head position tracking sensor 122, eye tracking system 124, and the user related data from secondary sensor 170, user tracking logic 128 can determine the intent of the user and if the user is looking at primary display 108, secondary display 110, or towards some other area. Display adjustment engine 130 can be configured to receive the data about the intent of the user from user tracking logic 128 and determine if the configuration of primary display 108 and/or secondary display 110 should be changed. More specifically, display reconfiguration engine 130 can be configured to receive the data about the intent of the user from user tracking logic 128 and determine that an application on primary display 108 and/or secondary display 110 should be changed, the user interface configuration on primary display 108 and/or the user interface configuration of secondary display 110 should change, or primary display 108 and/or secondary display 110 should enter into a low power configuration or standby mode to conserve power and/or battery. In some examples, the relatively low power head position tracking sensor 122 can be used to determine the user's intent. In other examples, palm detection areas 126a and 126b and/or peripheral detection engine 166 are used to determine the user's intent or to supplement data from head position tracking sensor 122 to determine the user's intent. If user tracking logic 128 cannot use head position tracking sensor 122, touch sensors 126a and 126b, and/or peripheral detection engine 166 to determine a user's intent, then eye tracking system 124 is used to determine the user's intent.

It is to be understood that other embodiments may be utilized and structural changes may be made without departing from the scope of the present disclosure. Substantial flexibility is provided by electronic device 100 in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Elements of FIGS. 1A and 1B may be coupled to one another through one or more interfaces employing any suitable connections (wired or wireless), which provide viable pathways for network (e.g., network 120, etc.) communications. Additionally, any one or more of the elements of FIG. 1A may be combined or removed from the architecture based on particular configuration needs. Network 120 may include a configuration capable of transmission control protocol/Internet protocol (TCP/IP) communications for the transmission or reception of packets in a network. Electronic device 100 may also operate in conjunction with a user datagram protocol/IP (UDP/IP) or any other suitable protocol where appropriate and based on particular needs.

For purposes of illustrating certain example techniques of electronic device 100, the following foundational information may be viewed as a basis from which the present disclosure may be properly explained. Generally, clamshell devices are devices where a first housing is pivotably coupled to a second housing. For example, a clamshell device can be a laptop, notebook computer or other a small, portable personal computer with a clamshell form factor typically having a computer display mounted on the inside of an upper first housing of the clamshell and an alphanumeric keyboard on the inside of a lower second housing of the clamshell. The clamshell is opened to use the device and folded shut for transportation or storage.

Dual display devices are becoming more popular and getting more attention. Having two displays can often provide a relatively good user experience and can help increase productivity by allowing a device to operate in a tablet configuration, a notebook configuration, a tent configuration, a laptop configuration, etc. One use case for dual display devices is in a clam shell configuration where the primary display is used as a lid to display content and the secondary display is used as a base for either an on-screen keyboard and touchpad, to display full video, or an application on the display without an on-screen keyboard and touchpad. In cases where the user is using both displays for displaying content and not using the secondary display as keyboard and touchpad, the user may turn their face upwards to view the primary display or turn their face downwards to view the secondary display. Based on the intent of the user and/or the user's head and eye position, the secondary display needs to change quickly to either a keyboard and touchpad configuration or a full display screen configuration for application content.

In some examples, when the gaze of the user and/or the user's head/eye position is upwards and viewing the primary display (e.g., a pitch angle is less than a critical angle), the secondary display should behave like keyboard and touch pad. When the gaze of the user and/or the user's head/eye position is downwards and viewing the secondary display (e.g., a pitch angle is greater than a critical angle), the system should be able to automatically change the secondary display's configuration to a note taking configuration. Currently there is no automated way to do this change of the secondary display for dual display devices. In current devices, the user needs to manually select the configuration of the secondary display to display the keyboard and touch pad, to enter a note taking configuration, to enter a full display configuration for displaying content, or a configuration where half of the display is displaying content or an application and the other half is a keyboard and is with or without a touch pad.

Currently, there are systems with eye tracking to determine an active display. Also, there are systems with head pose estimation, but none of the current systems address the specific problem of a dual display in a clamshell mode. In addition, previous solutions do not address the specific use case of a dual display in clamshell mode where a specific switching of configurations is needed between a keyboard and touchpad configuration and a full screen content display configuration or a note taking configuration. Further, some current systems do not allow for power saving to be achieved by keeping the non-engaged display in a low power state by lowering the brightness and refresh rate or forcing the system to a panel self-refresh state or configuration. Also, most current systems use eye tracking but current eye tracking systems can be power and computation hungry and may not be needed in all cases as head pose estimation may be enough to determine a user's intent in some use cases. Hence a combination of head and eye tracking is needed. What is needed is a system and method to allow for dynamically reconfiguring a display in a multi-display device.

A device to help facilitate a system and method for dynamically reconfiguring a display in a multi-display device, as outlined in FIGS. 1A and 1B, can resolve these issues (and others). In an example, an electronic device (e.g., electronic device 100) can include a system and method for dynamically reconfiguring a display in a multi-display device that can adjust the configuration of one or more displays based on a intent of the user (e.g., the relative distance of the user's face and eyes from the display, the position of the eyes relative to the display, the pupil orientation relative to the display, and/or the position of the head of the user relative to the display). The adjustment of the configuration of one or more displays based on the user's intent may be automatic and performed without requiring the user to manually adjust the configuration of one or more displays. More specifically, cameras, IR sensors, and/or eye tracking systems can be used to monitor and measure the eye pupil of a user and/or the face angle of the user and use the information to determine the user's gaze and based on the user's gaze, determine the user's intent, and automatically adjust the configuration of one or more displays based on the determined user's intent. The configuration of one or more displays can allow the user to use clamshell form factors with greater convenience and comfort as compared to some current devices and can help with power savings. The term "automatically adjust the configuration of one or more displays" means that the user does not need to manually adjust the configuration of one or more displays and the system will adjust the configuration of the one or more displays.

In an example, the system can be configured to use a camera (with minimum resolution and frames per second) with head orientation detection and eye tracking to determine the gaze of the user and the content to be displayed on a secondary display (e.g., either a keyboard and touch pad configuration or a full display screen configuration for applications such as a note taking application). Also, using user tracking logic 128 and display reconfiguration engine 130, the system can cause the display that is not engaged with the user to go to a low power mode by lowering the brightness and refresh rate or forcing the system to a panel self-refresh state or configuration (e.g., gradual dimming/PSR1/2).

The system can include a user facing camera for estimating the head pose or eye tracking or both as a hybrid and to change the secondary display configuration (e.g., either keyboard and touch pad or a full display screen) when the dual display is used in clamshell mode. With the help of the camera and user tracking logic 128, the system can determine head/eye position of the user, the gaze of the user, and whether the user is looking at the primary display or the secondary display.

In an example, if user looks at the primary display, the secondary display automatically changes to a keyboard and touch pad configuration. In the example where a user looks at the secondary display, a full screen configuration can be used for displaying an application such as a note taking application. Also, based on the user's activity, the display that is not engaged with the user can enter into a low power configuration or mode by lowering the brightness and refresh rate or forcing the system to a panel self-refresh state or configuration (e.g., gradual dimming/PSR1/2). This allows the system to improve responsiveness, adapt to user's roles, and increases the battery life. It can also provide a better user experience, as the secondary display automatically changes based on the user's engagement.

Power savings can be achieved using a hybrid methodology of head-pose and eye tracking use whichever is relevant based on the position of the user. Continuous eye tracking is not required in most of the use case scenarios. For example, when the user's head is tilted down, the eyes are not visible or when the user's head is tilted upwards the user can only see the primary display. Using only the head position to determine the user's intent can save power compared to continuous eye tracking. Also, adaptive dimming and a low power configuration or mode for the non-engaged display can help to save power.

In an illustrative example, when a user is in front of electronic device 100, the system (e.g., a camera 112, head position tracking sensors 122, eye tracking system 124, touch sensors 126a and 126b, user tracking logic 128, peripheral detection engine 166, etc.) can be configured to detect, determine, and monitor the intent of the user. The data regarding the intent of the user is used to help adjust the configuration of one or more displays, for example, to a note taking application while the user is viewing a lecture or presentation on the primary display. The system can include a user engagement detection engine (e.g., user tracking logic 128) that tracks the user based on the user's head position and eye tracking. Additional inputs from the user, like engagement with the touchscreen of the secondary display (e.g., palms rested while using a virtual keyboard, use of a stylus, etc.) can be used to supplement the tracking methodology. For example, when the user's palms are rested on secondary display, there is no need for eye tracking as the user is most likely engaged with the primary display and the user is typing or preparing to type.

In an illustrative example, a user is sitting in front of a dual display device. The system is used in clamshell mode, both displays are on, and an application or applications are opened on both displays. For example, the primary display can display web browsing and the secondary display can be used in a virtual keyboard configuration. A user tracking engine (e.g., user tracking logic 128) can determine the use's intent and if the user is engaged with the primary display or the secondary display. In some examples, to determine the intent of the user, the following priority may be used, first head tracking (pitch angle comparison with critical angle), then palm detection and palm resting on secondary display and peripheral detection, and finally eye tracking (pitch angle comparison with critical angle).

If the user's head/eye position is greater than a critical angle, the system can dim the primary display and allow the secondary display to have full power to allow the user to use an application on the secondary display (e.g., the note taking application). If the user's head/eye position is less than a critical angle, then the system can determine that the user is engaged with primary display. The system can make the secondary display enter a keyboard and touch pad configuration and dim the secondary display for power savings and the primary display will operate and without any brightness changes.

Regarding the palm rest detection, the system can use the palm rest status to determine the user's intention. For example, the user's head position may be upwards, eye balls looking down (like a peeping or thief look). In this example, if the palms are rested on the secondary display, the relative power-hungry eye tracking can be ignored or not used and the system may use the head position only to determine the user's intent. If the user's palms are not rested on the secondary display, then the system can determine that the user intends to see the content on the secondary display. In some examples, artificial intelligence and deep learning can be used to improve the accuracy. In a clamshell mode, palm resting percentage is lot higher due to the secondary display being mostly used as a keyboard for typing. In this example, the head position tracking percentage is more dominant than the head and eye tracking percentage. Since the system is tracking mostly the head position, the power saving will be more compared to eye tracking, as eye tracking consumes a greater amount of power than tracking the head position.

There will be some corner cases like typing without resting the palms etc. and to address the corner cases and the false detections, artificial intelligence and deep learning can be used. Artificial intelligence can be combined with deep learning methodologies where the typing behavior or usage behavior of a large number of users can be used to train a deep learning engine so that the system can infer the best possible outcome to avoid the false detection. In some examples, cloud services 114, server 116, and/or network element 118 can include a network false detection engine that includes the artificial intelligence and deep learning methodologies. The network false detection engine can use network 120 to collect data and employ deep learning methodologies to try and mitigate or reduce the amount of false detections. In addition, the user can be given an option to switch configurations manually with stroke keys in case of the false detection.

Turning to the infrastructure of FIG. 1A, network 120 represents a series of points or nodes of interconnected communication paths for receiving and transmitting packets of information. Network 120 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 120, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

In an example implementation, electronic device 100, is meant to encompass a computer that has a clamshell form factor, a laptop or electronic notebook, network elements that have a clamshell form factor, or any other device, component, element, or object that has a clamshell form factor, design, profile, etc. Electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100 may include virtual elements.

In regards to the internal structure, electronic device 100 can include memory elements for storing information to be used in the operations outlined herein. Electronic device 100 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 100 may include software modules (e.g., user tracking logic 128, display reconfiguration engine 130, etc.) and/or circuitry and logic to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 100 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2A:
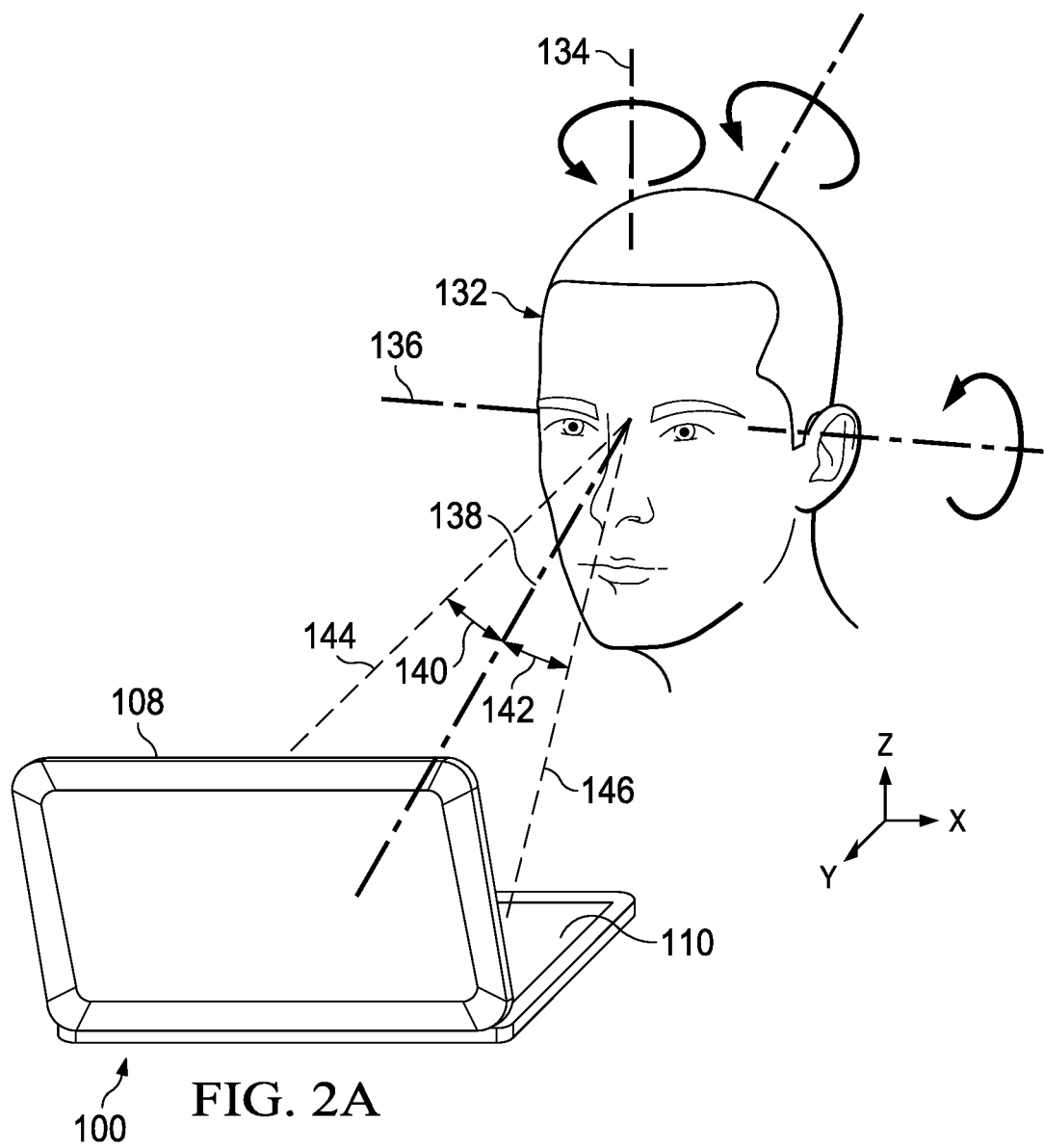
FIG. 2A is a simplified block diagram of a portion of a system illustrating example details to enable a system and method for dynamically reconfiguring a display in a multi-display device, in accordance with an embodiment of the present disclosure.

Turning to FIG. 2A, FIG. 2A a simplified diagram of a user's head 132 is show with illustrative details in accordance with an embodiment of the present disclosure. In an example, user's head 132 can include a yaw axis 134 and a pitch axis 136. User's head 132 is rotated on yaw axis 134 when user's head 132 is moved to the left or right. User's head 132 is rotated on pitch axis 136 when user's head is moved up and down. User's head 132 can also include a roll axis (not shown).

In an illustrative example, a primary display center plane 138 can be defined as an axis that is relative to primary display 108 when the user is looking at a middle portion of primary display 108 or the user's gaze is towards a middle portion of primary display 108. The user can rotate user's head 132 on pitch axis 136 up or down relative to primary display center plane 138 to view primary display 108. For example, the user may rotate user's head 132 up an upper angle 140 on pitch axis 136 to upper critical plane 144. If the user rotates user's head 132 past upper critical plane 144, the user will no longer be looking at primary display 108 but instead will be looking over display 108. In addition, the user may rotate user's head 132 down a downward angle 142 on pitch axis 136 to lower critical plane 146. If the user rotates user's head 132 past lower critical plane 146, the user will no longer be looking at primary display 108 but instead the user's gaze will be down and the user will be looking at lower display 110.

Figure 2B:
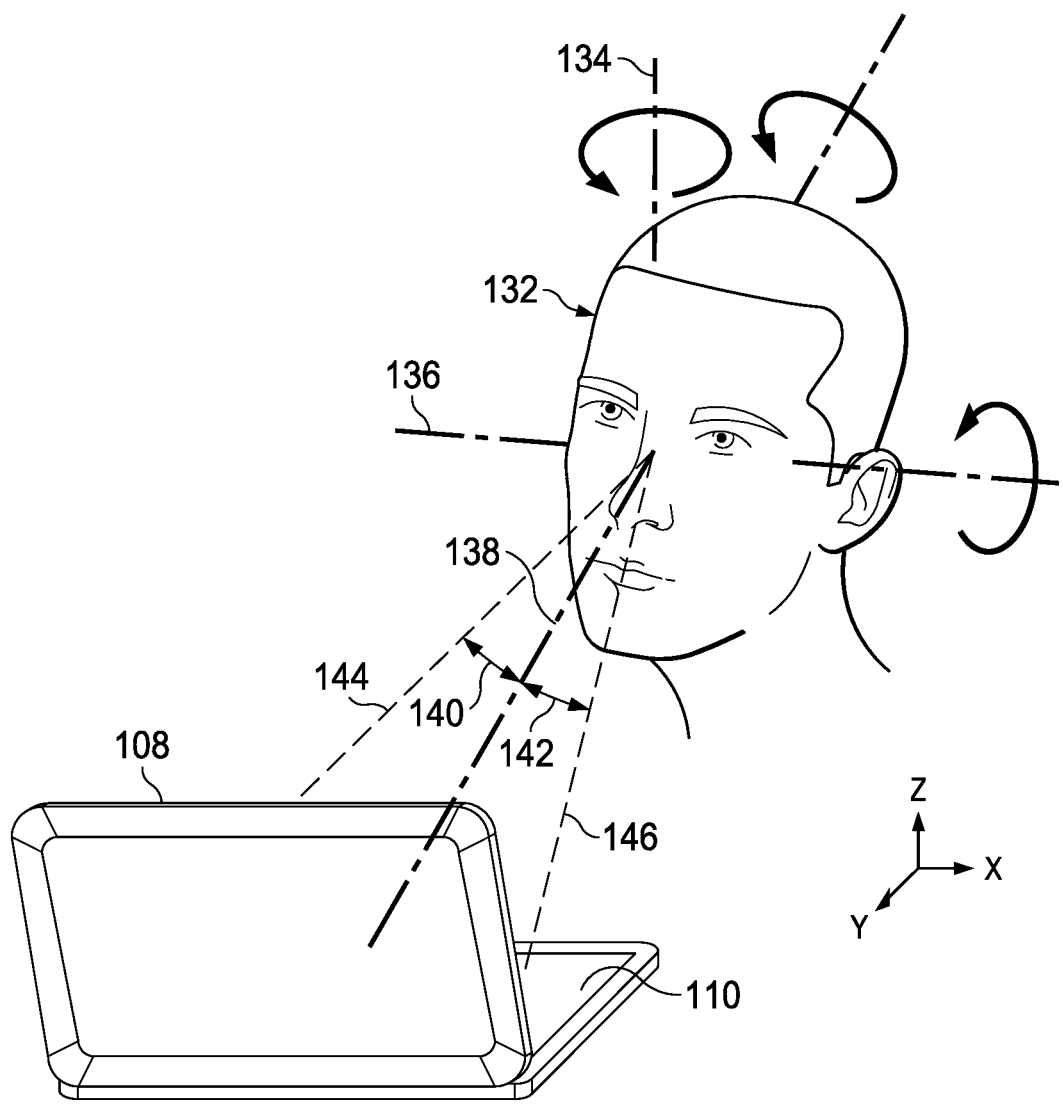
FIG. 2B is a simplified block diagram of a portion of a system illustrating example details to enable a system and method for dynamically reconfiguring a display in a multi-display device, in accordance with an embodiment of the present disclosure.

Turning to FIG. 2B, FIG. 2B is a simplified diagram of a user's head 132 is show with illustrative details in accordance with an embodiment of the present disclosure. In an example, user's head 132 can include yaw axis 134 and pitch axis 136. User's head 132 is rotated on yaw axis 134 when user's head 132 is moved to the left or right. User's head 132 is rotated on pitch axis 136 when user's head is moved up and down. In an illustrative example, primary display center plane 138 can be defined as an axis that is relative to primary display 108 when the user is looking at a middle portion of primary display 108 or the user's gaze is towards a middle portion of primary display 108. The user can rotate user's head 132 on pitch axis 136 up or down relative to primary display center plane 138. If the user rotates user's head 132 past upper critical plane 144, the user will no longer be looking at primary display 108 but instead the user's gaze will be past upper critical plane 144 and the user will be looking over primary display 108, as illustrated in FIG. 2B.

Figure 2C:
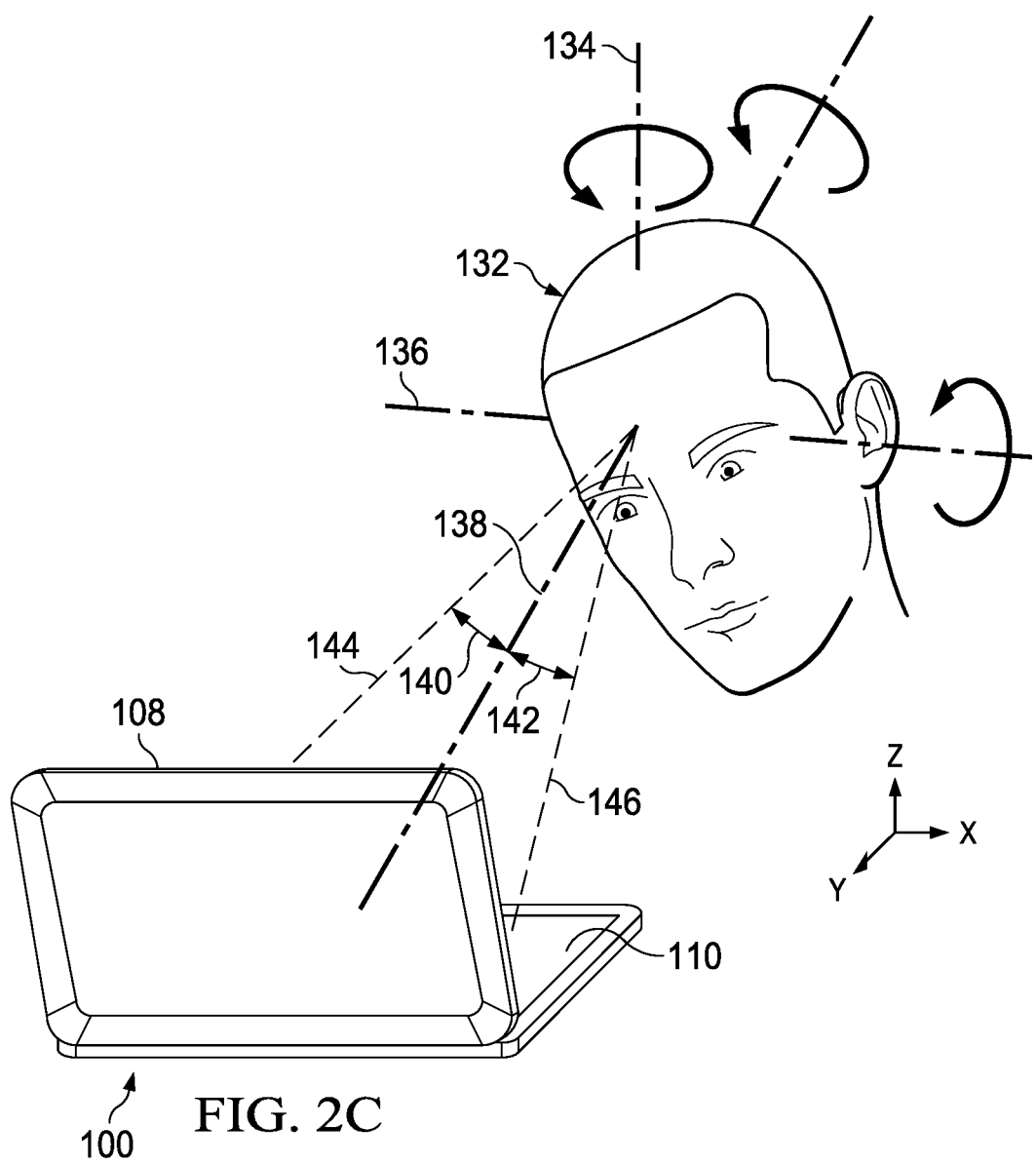
FIG. 2C is a simplified block diagram of a portion of a system illustrating example details to enable a system and method for dynamically reconfiguring a display in a multi-display device, in accordance with an embodiment of the present disclosure.

Turning to FIG. 2C, FIG. 2C is a simplified diagram of a user's head 132 is show with illustrative details in accordance with an embodiment of the present disclosure. In an example, user's head 132 can include yaw axis 134 and pitch axis 136. User's head 132 is rotated on yaw axis 134 when user's head 132 is moved to the left or right. User's head 132 is rotated on pitch axis 136 when user's head is moved up and down. In an illustrative example, primary display center plane 138 can be defined as an axis that is relative to primary display 108 when the user is looking at a middle portion of primary display 108 or the user's gaze is towards a middle portion of primary display 108. The user can rotate user's head 132 on pitch axis 136 up or down relative to primary display center plane 138. If the user rotates user's head 132 past lower critical plane 146, the user will no longer be looking at primary display 108 but instead the user's gaze will be past lower critical plane 146 and the user will be looking at secondary display 110, as illustrated in FIG. 2C.

Figure 2D:
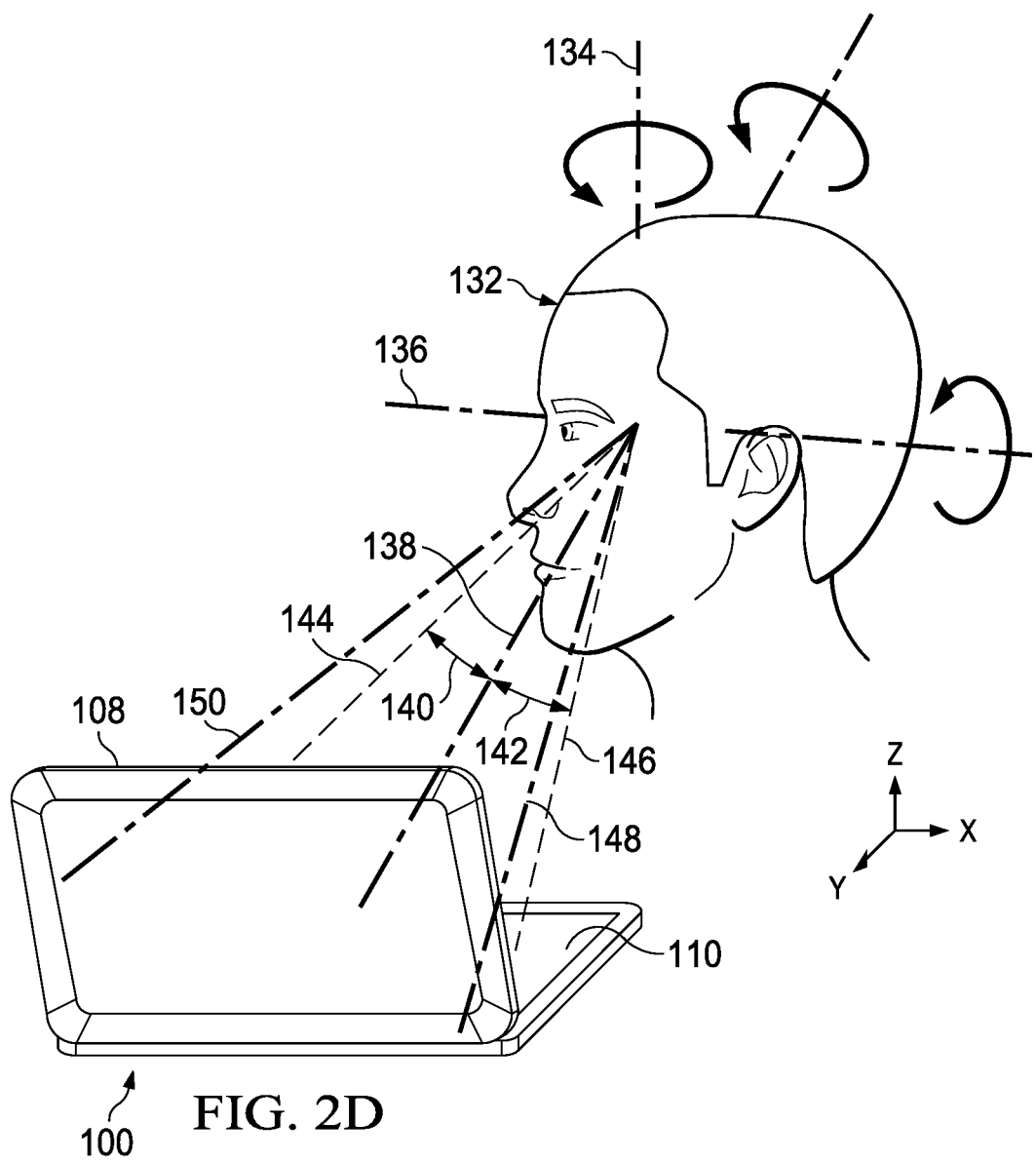
FIG. 2D is a simplified block diagram of a portion of a system illustrating example details to enable a system and method for dynamically reconfiguring a display in a multi-display device, in accordance with an embodiment of the present disclosure.

Turning to FIG. 2D, FIG. 2D is a simplified diagram of a user's head 132 is show with illustrative details in accordance with an embodiment of the present disclosure. In an example, user's head 132 can include yaw axis 134 and pitch axis 136. User's head 132 is rotated on yaw axis 134 when user's head 132 is moved to the left or right. User's head 132 is rotated on pitch axis 136 when user's head is moved up and down. In an illustrative example, the user can rotate user's head 132 on yaw axis 134 left or right relative to primary display center plane 138 to view primary display 108. For example, the user may rotate user's head 132 to the left on yaw axis 134 to left critical plane 148 or to the right on yaw axis 134 to right critical plane 150. If the user rotates user's head 132 past left critical plane 148 or past right critical plane 150, the user will no longer be looking at primary display 108 but instead will be looking to the left of primary display 108 or to the right of primary display 108. For example, as illustrated in FIG. 2D, the user's gaze is past right critical plane 150 and the user is looking to the right past right critical plane 150 and is not looking at primary display 108.

Turning to FIG. 3A, FIG. 3A is a simplified block diagram of a portion of electronic device 100 configured to include a system and method for dynamically reconfiguring a display in a multi-display device. In an example, electronic device 100 can include first housing 102 and second housing 104. First housing 102 can be pivotably coupled to second housing 104 using hinge 106. First housing 102 can include primary display 108 and camera 112. Second housing 104 can include secondary display 110. When the user is looking at electronic device 100, primary display center plane 138 can be defined as an axis that is relative to primary display 108 when the user is looking at a middle portion of primary display 108 or the user's gaze is towards a middle portion of primary display 108. The user can rotate user's head 132 on pitch axis 136 up or down relative to primary display center plane 138 to view primary display 108. For example, the user may rotate user's head 132 up an upper angle 140 on pitch axis 136 to upper critical plane 144. If the user rotates user's head 132 past upper critical plane 144, the user will no longer be looking at primary display 108 but instead the gaze of the user will be past upper critical plane 144 and the user will be looking over primary display 108. In addition, the user may rotate user's head 132 down a downward angle 142 on pitch axis 136 to lower critical plane 146. If the user rotates user's head 132 past lower critical plane 146, the user will no longer be looking at primary display 108 but instead the gaze of the user will be past lower critical plane 146 and the user will be looking at secondary display 110. FIG. 3A illustrates where user is using both displays for displaying applications. More specifically, as illustrated in FIG. 3A, primary display 108 is being used for web browsing or other content and secondary display 110 is being used as a keyboard.

Figure 3B:
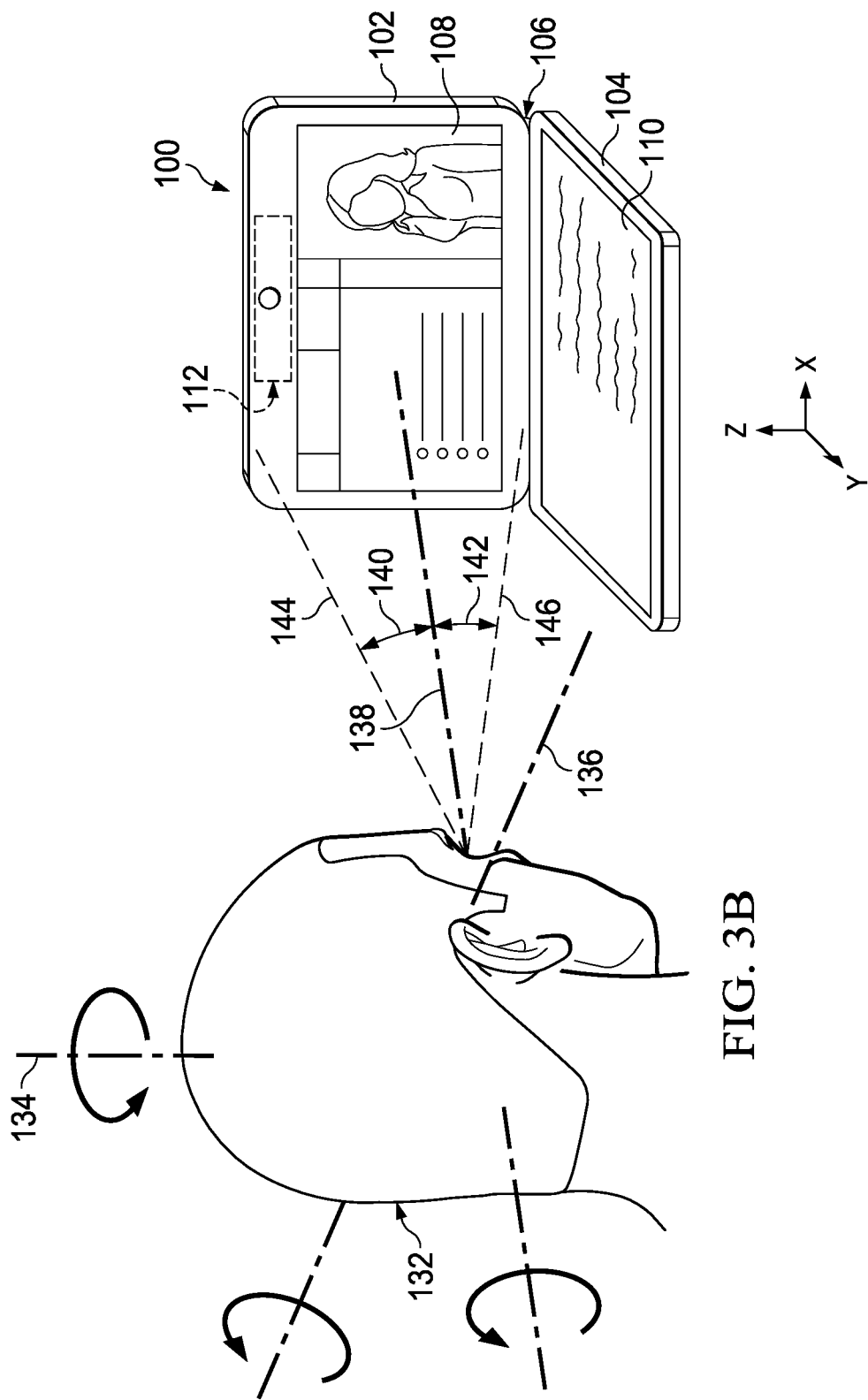
FIG. 3B is a simplified block diagram of a portion of a system to enable a system and method for dynamically reconfiguring a display in a multi-display device, in accordance with an embodiment of the present disclosure.

Turning to FIG. 3B, FIG. 3B is a simplified block diagram of a portion of electronic device 100 configured to include a system and method for dynamically reconfiguring a display in a multi-display device. In an example, electronic device 100 can include first housing 102 and second housing 104. First housing 102 can be pivotably coupled to second housing 104 using hinge 106. First housing 102 can include primary display 108 and camera 112. Second housing 104 can include secondary display 110. When the user is looking at electronic device 100, primary display center plane 138 can be defined as an axis that is relative to primary display 108 when the user is looking at a middle portion of primary display 108 or the user's gaze is towards a middle portion of primary display 108. The user can rotate user's head 132 on pitch axis 136 up or down relative to primary display center plane 138. For example, the user may rotate user's head 132 down on pitch axis 136 past lower critical plane 146 and the user will no longer be looking at primary display 108 but instead will be looking at lower display 110. More specifically, as illustrated in FIG. 3B, the user is no longer looking at primary display 108 but instead the gaze of the user is past lower critical plane 146 and the user is looking at secondary display 110 while primary display 108 is displaying a lecture or presentation. Display reconfiguration engine 130 can be configured to cause secondary display 110 to be configured as a full screen with a note taking application and allow the user to take notes during the lecture or presentation.

In an example, the system can be configured to use camera 112 and user tracking logic 128 to determine head/eye position. Display reconfiguration engine 130 can be configured to receive data from user tracking logic 128 and change the contents and/or power level of primary display 108 and/or secondary display 110. When the user's head/eye position is upwards and viewing primary display 108, display reconfiguration engine 130 can be configured to change the configuration of secondary display 110 to a keyboard and/or touch pad configuration. When the user's head/eye position is downwards and viewing secondary display 110, display reconfiguration engine 130 can be configured to cause secondary display 110 to be configured as a full screen with a note taking application. As user tracking logic 128 is continuously monitoring the user's head/eye position, display reconfiguration engine 130 can dynamically change to configuration and behavior of primary display 108 and/or secondary display 110. In some examples, camera 112 can be running at a minimal FPS and resolution based on the usage and head/eye tracking.

Figure 4:
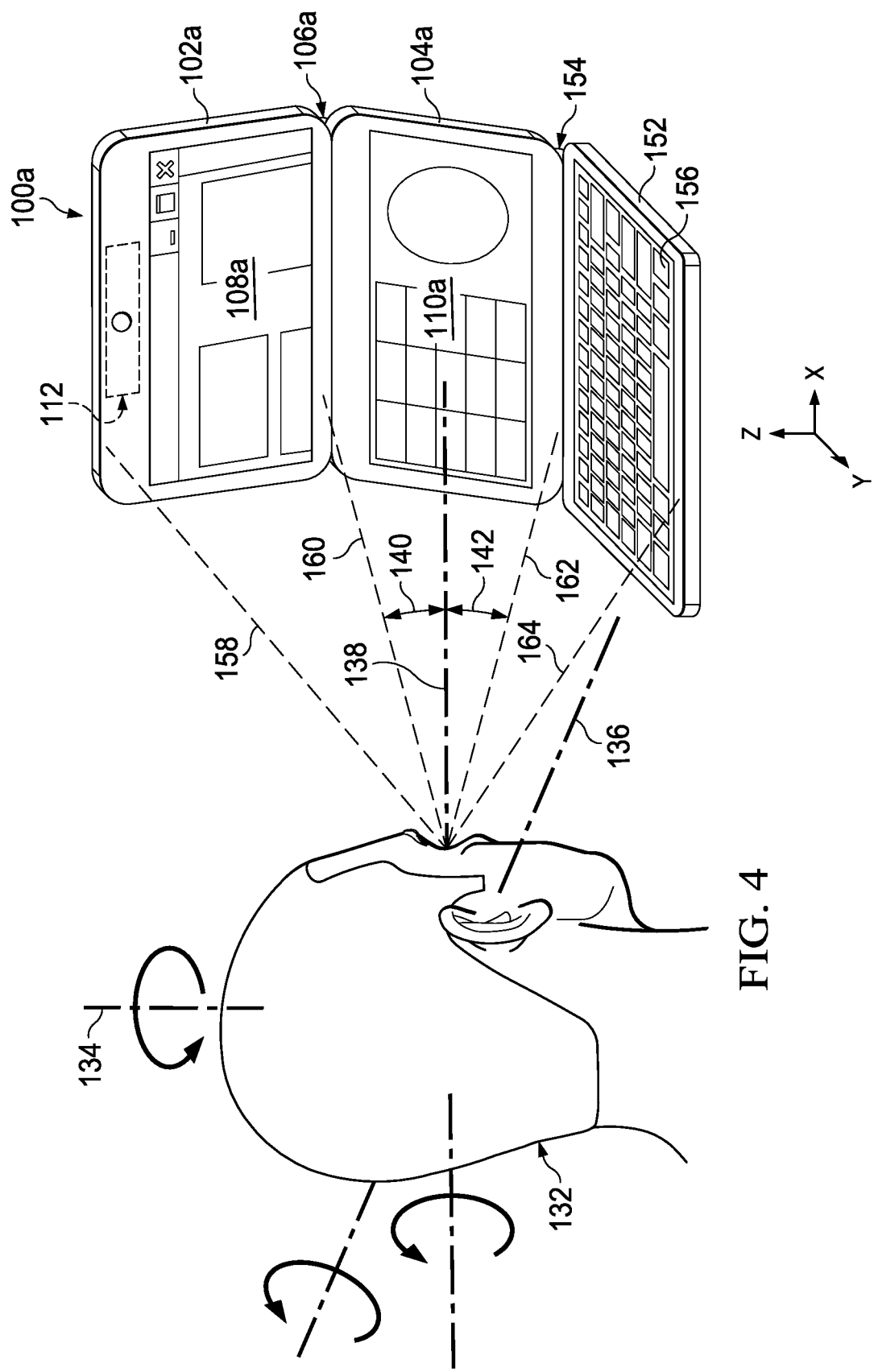
FIG. 4 is a simplified block diagram of a portion of a system to enable a system and method for dynamically reconfiguring a display in a multi-display device, in accordance with an embodiment of the present disclosure.

Turning to FIG. 4, FIG. 4 is a simplified block diagram of a portion of electronic device 100a configured to include a system and method for dynamically reconfiguring a display in a multi-display device. In an example, electronic device 100a can include first housing 102a, second housing 104a, and third housing 152. First housing 102a can be pivotably coupled to second housing 104a using hinge 106a. Third housing 152 can be rotatably coupled to second housing 104a using second hinge 154. First housing 102a can include primary display 108a and camera 112. Second housing 104 can include secondary display 110a. Third housing 152 can include third display 156. In one configuration of electronic device 100a, the combination of second housing 104 and third housing 152 may be relatively the same size and/or form factor as first housing 102a such that first housing 102 can pivot or rotate over second housing 104 and third housing 152 in a closed clamshell configuration. In other configurations of electronic device 100a, one or more of first housing 102a, second housing 104, and third housing 152 can be relatively the same size and/or form factor.

User's head 132 can include yaw axis 134 and pitch axis 136. The user can rotate user's head 132 on pitch axis 136 up or down. to view primary display 108a. For example, the user may rotate user's head 132 between primary display upper critical plane 158 and primary display lower critical plane 160 to view primary display 108a. If the user rotates user's head 132 past primary display upper critical plane 158, the user will no longer be looking at primary display 108a but instead will be looking over primary display 108a. In addition, the user may rotate user's head 132 down to primary display lower critical plane 160. If the user rotates user's head 132 past primary display lower critical plane 160, the user will no longer be looking at primary display 108a but instead will be looking at secondary display 110a. The user may rotate user's head 132 between primary display lower critical plane 160 and second display lower critical plane 162 to view secondary display 110a. While viewing secondary display 110a, if the user rotates user's head 132 up past primary display lower critical plane 160, the user will no longer be looking at secondary display 110a but instead will be looking at primary display 108a. In addition, while viewing secondary display 110a, the user may rotate user's head 132 down to second display lower critical plane 162. If the user rotates user's head 132 past second display lower critical plane 162, the user will no longer be looking at secondary display 110a but instead will be looking at third display 156. The user may rotate user's head 132 between second display lower critical plane 162 and third display lower critical plane 164 to view third display 156. While viewing third display 156, if the user rotates user's head 132 up past second display lower critical plane 162, the user will no longer be looking at third display 156 but instead will be looking at secondary display 110a. In addition, while viewing third display 156, the user may rotate user's head 132 down to third display lower critical plane 164. If the user rotates user's head 132 past third display lower critical plane 164, the user will no longer be looking at third display 156 but instead will be looking past third display 156 (e.g., at a surface supporting electronic device 100a). Based on the intent of the user and/or other features of a user, the configuration and/or power state of primary display 108a, secondary display 110a, and/or third display 156 can be changed.

Figure 5:
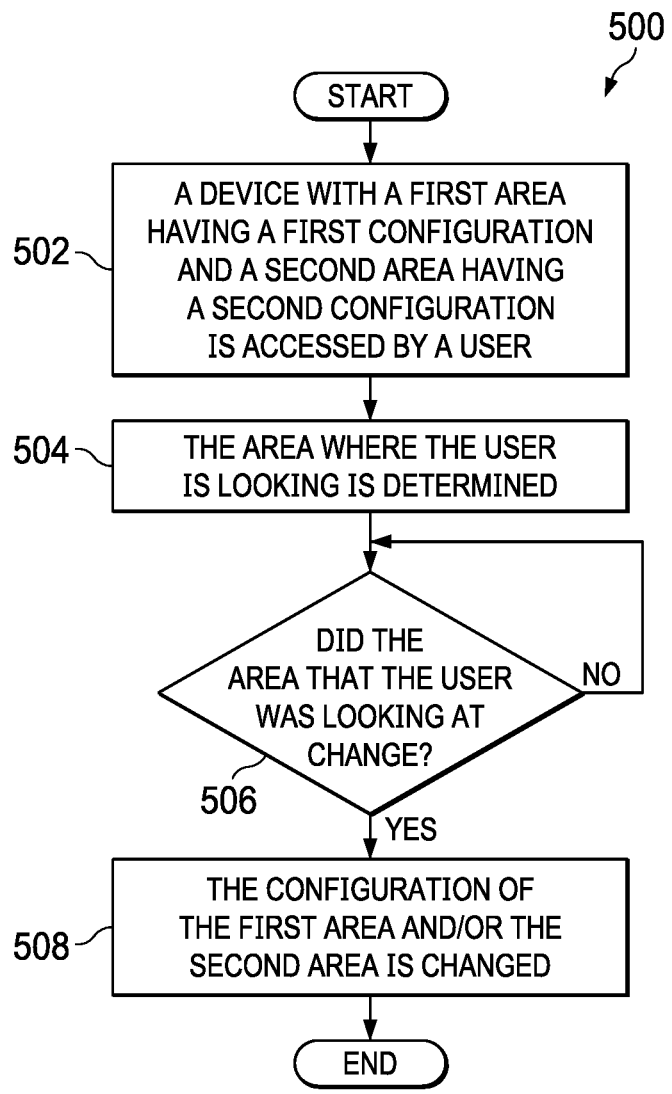
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with enabling a system and method for dynamically reconfiguring a display in a multi-display device, in accordance with an embodiment. The flowchart may be implemented in computer readable instructions which may be executed by a processor within an electronic device having multiple displays. In one example, at least one of the displays is a touch display. In an embodiment, one or more operations of flow 500 may be performed by user tracking logic 128 or display reconfiguration engine 130. At block 502, user tracking logic 128 determines that the user is actively engaged with a primary display of the electronic device. Active engagement can mean that the user's focus is on the primary display or that the user intends to interact with the primary display. The user's focus on the primary display can be the user viewing an application outputted on the primary display. Similarly, the user's intent to interact with the primary display can be the user interacting with an application outputted on the primary display. At block 504, user tracking logic 128 periodically identifies the display that the user is actively engaged in. At block 506, user tracking logic 128 detects whether the display that the user is actively engaged with has changed. If there is no change, use tracking logic 128 returns to block 504. If a change is detected, user tracking logic 128 notifies display reconfiguration engine 130 of the change at block 508. At block 510, display reconfiguration engine can reconfigure one or more displays of the electronic device. Reconfiguration of the one or more displays can be to improve the user experience or to improve the power savings of electronic device. In one example, display reconfiguration engine 130 may reduce the power consumption of the display that the user is no longer actively engaged in. Reduction of the power consumption can include reducing the refresh cycle of the display panel, reducing the brightness or luminance of the display panel, or reducing the resolution of the display panel. In display panels that can partially dim, reduction of the power consumption can include reducing the brightness or luminance of portions of the display panel. In another example, display reconfiguration engine 130 may increase the power consumption of the display that the user is now actively engaged in. This may be to improve the user experience by improving the brightness, luminance, refresh cycle, or resolution of the display that the user is actively engaged with. While brightness, luminance, refresh cycle, and resolution are mentioned here, it's clear to those of skill in the art that display reconfiguration engine 130 may also alter other properties of the display to either improve the visual appearance of the display or to reduce the power consumption of the display.

Figure 6:
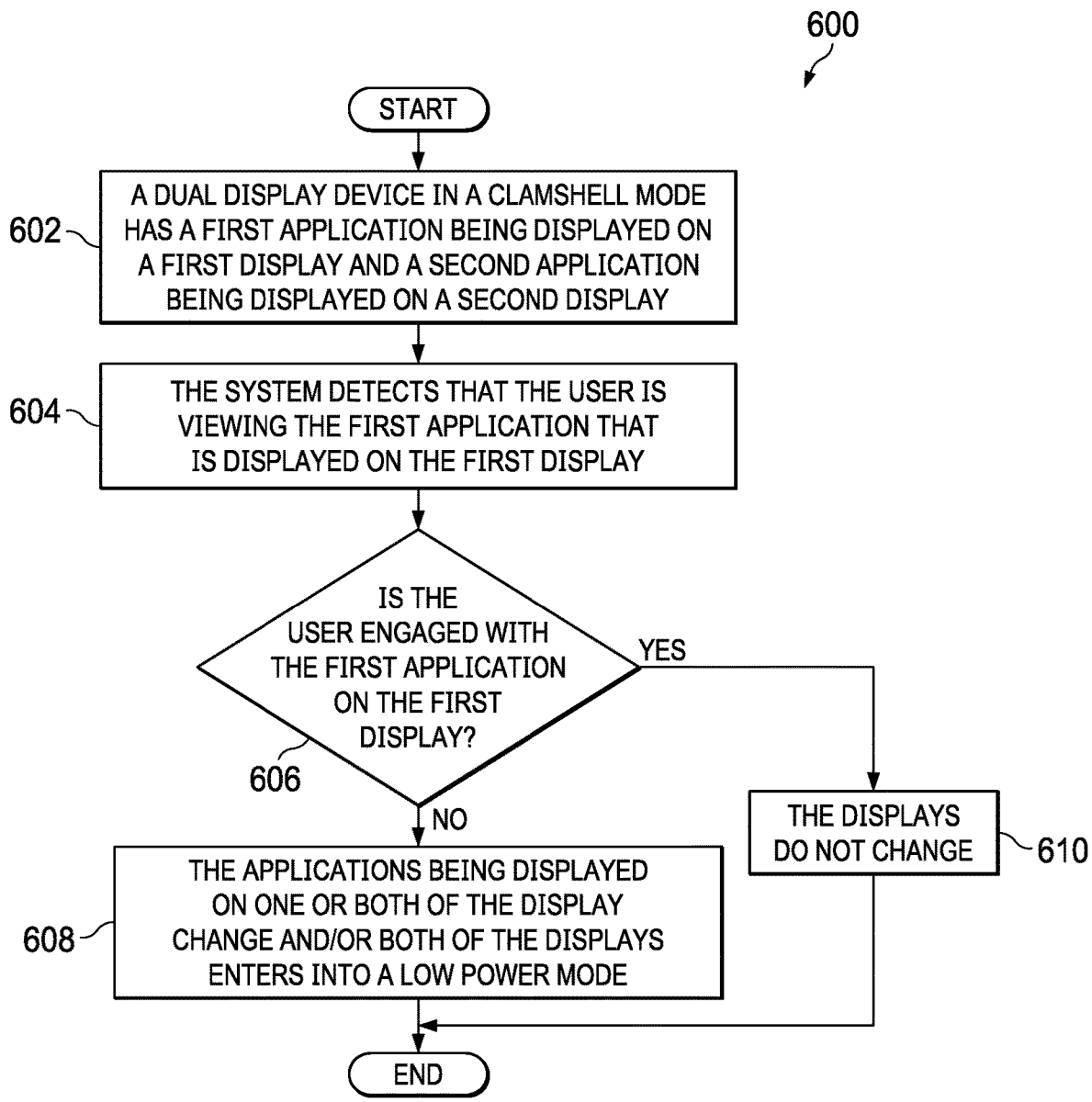
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with enabling a system and method for dynamically reconfiguring a display in a multi-display device, in accordance with an embodiment. In an embodiment, one or more operations of flow 600 may be performed by user tracking logic 128 or display reconfiguration engine 130. At 602, a dual display device in a clamshell mode has a first application being displayed on a first display (e.g., primary display 108) and a second application being displayed on a second display (e.g., secondary display 110). At 604, the system detects that the user is viewing the first application that is displayed on the first display. At 606, the system determines if the user is engaged with the first application on the first display. For example, the system may determine that the user is no longer viewing the first application that is displayed on the first display. If the user is engaged with the first application on the first display, then the displays do not change, as in 610. If the user is not engaged with the first application on the first display, then the first application that is displayed on the first display changes, the second application that is displayed on the second display changes, the first display enters into a low power mode, and/or the second display enters into a low power mode. The system can determine the intent of the user and if the user is engaged with the first application on the first display using data from head position tracking sensor 122, eye tracking system 124, and the user related data from secondary sensor 170 to determine an intent of the user.

Figure 7:
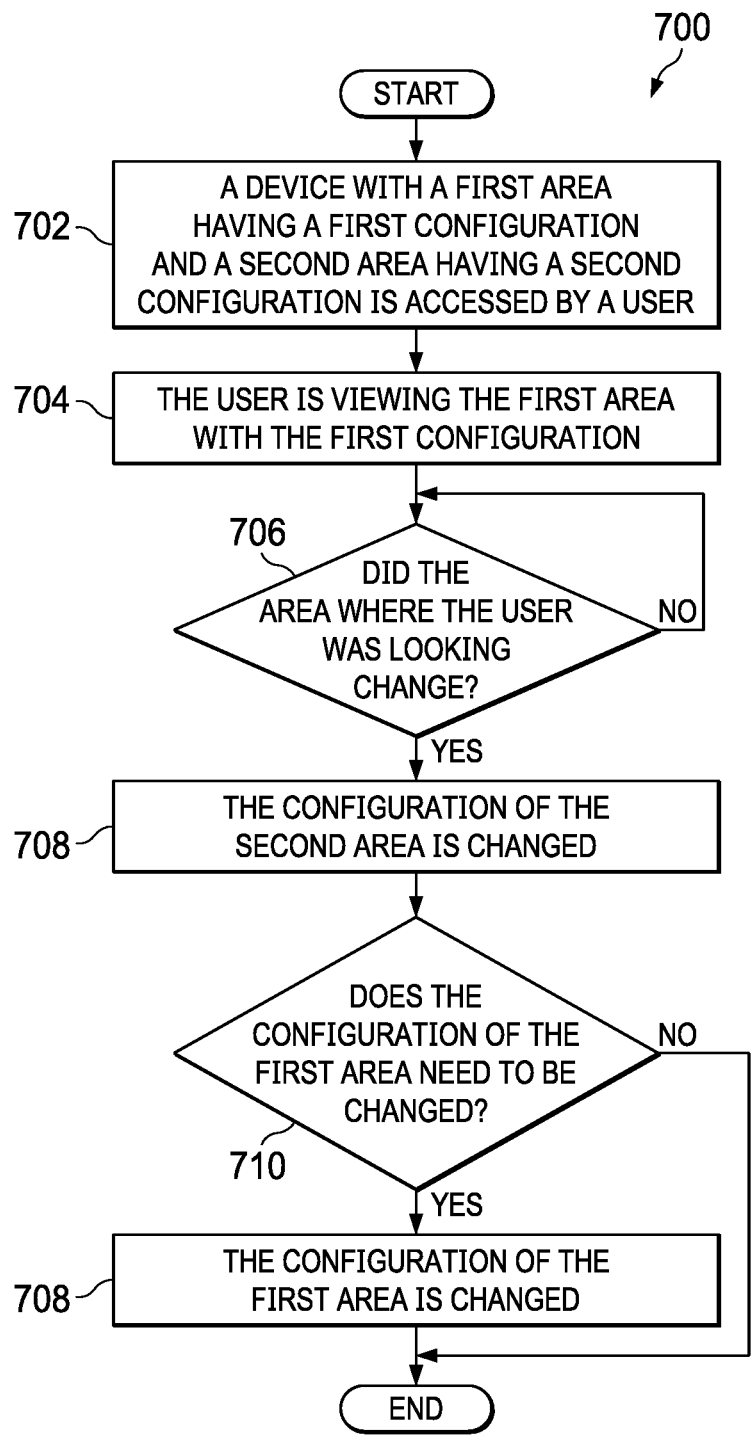
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with enabling a system and method for dynamically reconfiguring a display in a multi-display device, in accordance with an embodiment. In an embodiment, one or more operations of flow 700 may be performed by user tracking logic 128 or display reconfiguration engine 130. At 702, a device with a first area having a first configuration and a second area having a second configuration is accessed by a user. At 704, the user is viewing the first area with the first configuration. At 706, the system determines if the area where the user is looking changes (the gaze of the user changes). If the system determines that the area where the user is looking does not change, then the system again determines if the area where the user is looking changes, as in 706. If the system determines that the area where the user is looking does change, then the configuration of the second area is changed, as in 708. At 710, the system determines if the configuration of the first area needs to be changed. If the configuration of the first area needs to be changed, then the configuration of the first area is changed, as in 712. If the configuration of the first area does not need to be changed, then the process ends.

Figure 8:
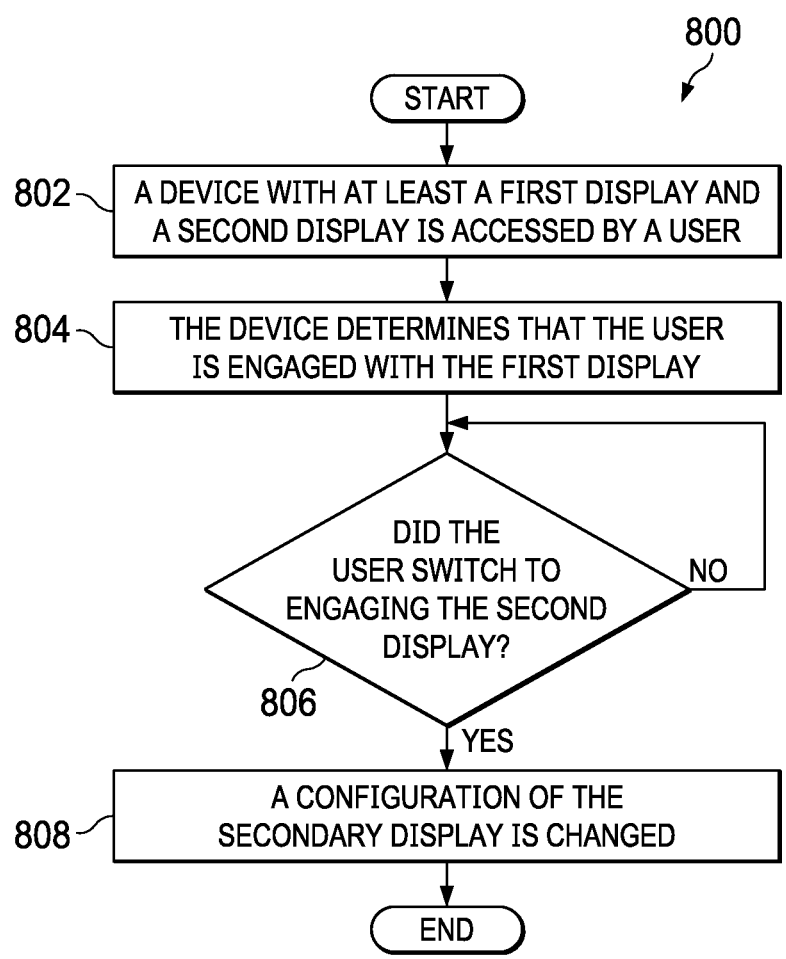
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with enabling a system and method for dynamically reconfiguring a display in a multi-display device, in accordance with an embodiment. In an embodiment, one or more operations of flow 800 may be performed by user tracking logic 128 or display reconfiguration engine 130. At 802, a device with at least a first display and a second display is accessed by a user. At 804, the device determines that the user is engaged with the first display. At 806, the device determines if the user switched to engaging with the second display. If the user did not switch to engaging with the second display, then the device again determines if the user switched to engaging with the second display, as in 806. If the device determines the user switched to engaging with the second display, then a configuration (e.g., typing user interface configuration, note taking user interface configuration, etc.) or mode of the second display is changed, as in 808. The system can determine if the user switched to engaging with the second display by using data from head position tracking sensor 122, eye tracking system 124, and the user related data from secondary sensor 170 to determine an intent of the user.

Figure 9:
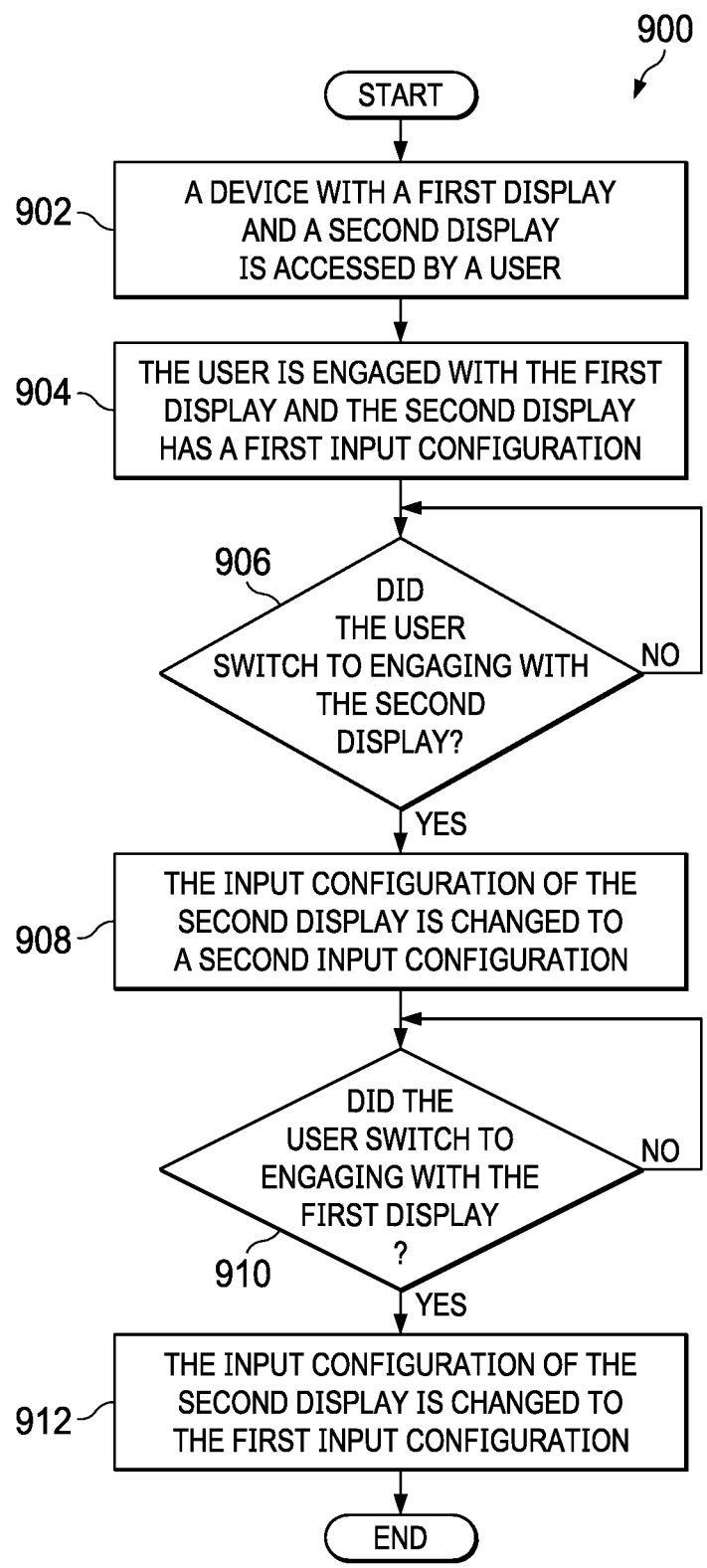
FIG. 9 is a simplified flowchart illustrating potential operations that may be associated with the system in accordance with an embodiment.

Turning to FIG. 9, FIG. 9 is an example flowchart illustrating possible operations of a flow 900 that may be associated with enabling a system and method for dynamically reconfiguring a display in a multi-display device, in accordance with an embodiment. In an embodiment, one or more operations of flow 900 may be performed by user tracking logic 128 or display reconfiguration engine 130. At 902, a device with a first display and a second display is accessed by a user. At 904, the user is engaged with the first display and the second display has a first input configuration (e.g., typing user interface configuration, note taking user interface configuration, etc.) or mode. At 906, the system determines if the user switched to engaging with the second display. If the user did not switch to engaging with the second display, then the system again determines if the user switched to engaging with the second display, as in 906. If the user switched to engaging with the second display, then the input configuration of the second display is changed to a second configuration (e.g., changed from a typing user interface configuration to a note taking user interface configuration), as in 908. At 910, the system determines if the user switched to engaging with the first display. If the user did not switch to engaging with the first display, then the system again determines if the user switched to engaging with the first display, as in 910. If the user switched to engaging with the first display, then the input configuration of the second display is changed to the first input configuration (e.g., changed from a note taking user interface configuration to a typing user interaction configuration), as in 912. The system can determine if the user switched to engaging with the second display by using data from head position tracking sensor 122, eye tracking system 124, and the user related data from secondary sensor 170 to determine an intent of the user.

Figure 10:
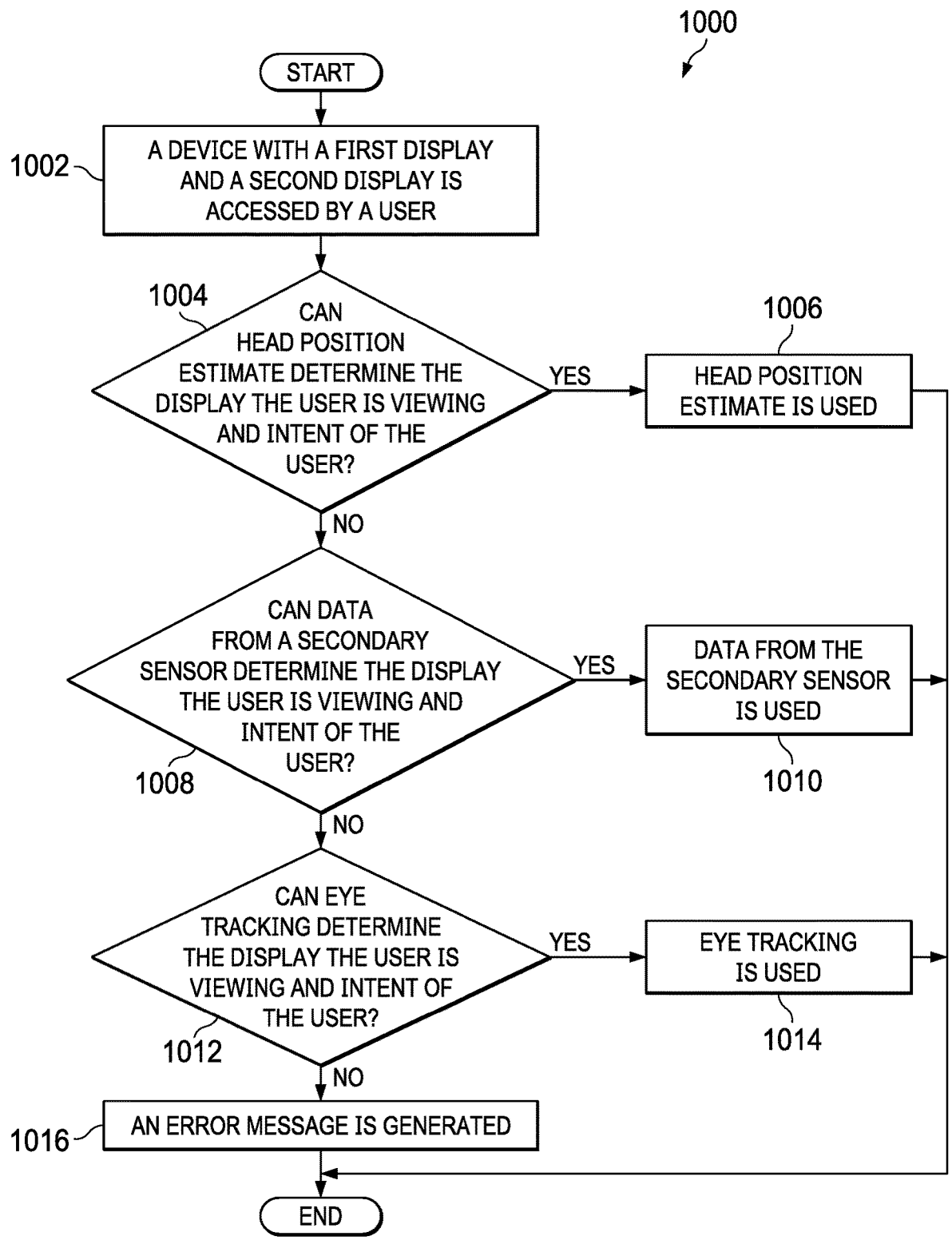
FIG. 10 is a simplified flowchart illustrating potential operations that may be associated with the system in accordance with an embodiment.

Turning to FIG. 10, FIG. 10 is an example flowchart illustrating possible operations of a flow 1000 that may be associated with enabling a system and method for dynamically reconfiguring a display in a multi-display device, in accordance with an embodiment. In an embodiment, one or more operations of flow 1000 may be performed by user tracking logic 128 or display reconfiguration engine 130. At 1002, a device with a first display and a second display is accessed by a user. At 1004, the system determines if head position estimation can be used to determine the display the user is viewing and intent of the user. If head position estimation can be used to determine the display the user is viewing and the intent of the user, then head position estimation is used to determine the display the user is viewing and the intent of the user, as in 1006. If head position estimation cannot be used to determine the display the user is viewing and the intent of the user, then the system determines if data from a secondary sensor can be used to determine the display the user is viewing and the intent of the user, as in 1008. If the data from the secondary sensor can be used to determine the display the user is viewing and the intent of the user, then the data from the secondary sensor is used to determine the display the user is viewing and the intent of the user, as in 1010. If the data from the secondary sensor cannot be used to determine the display the user is viewing and the intent of the user, then the system determines if eye tracking can be used to determine the display the user is viewing and the intent of the user, as in 1012. If eye tracking can be used to determine the display the user is viewing and the intent of the user, then eye tracking is used to determine the display the user is viewing and the intent of the user, as in 1014. If eye tracking cannot be used to determine the display the user is viewing and the intent of the user, then an error message is generated, as in 1016. The system can determine the display the user is viewing and the intent of the user by using data from head position tracking sensor 122, eye tracking system 124, and the user related data from secondary sensor 170.

Figure 11:
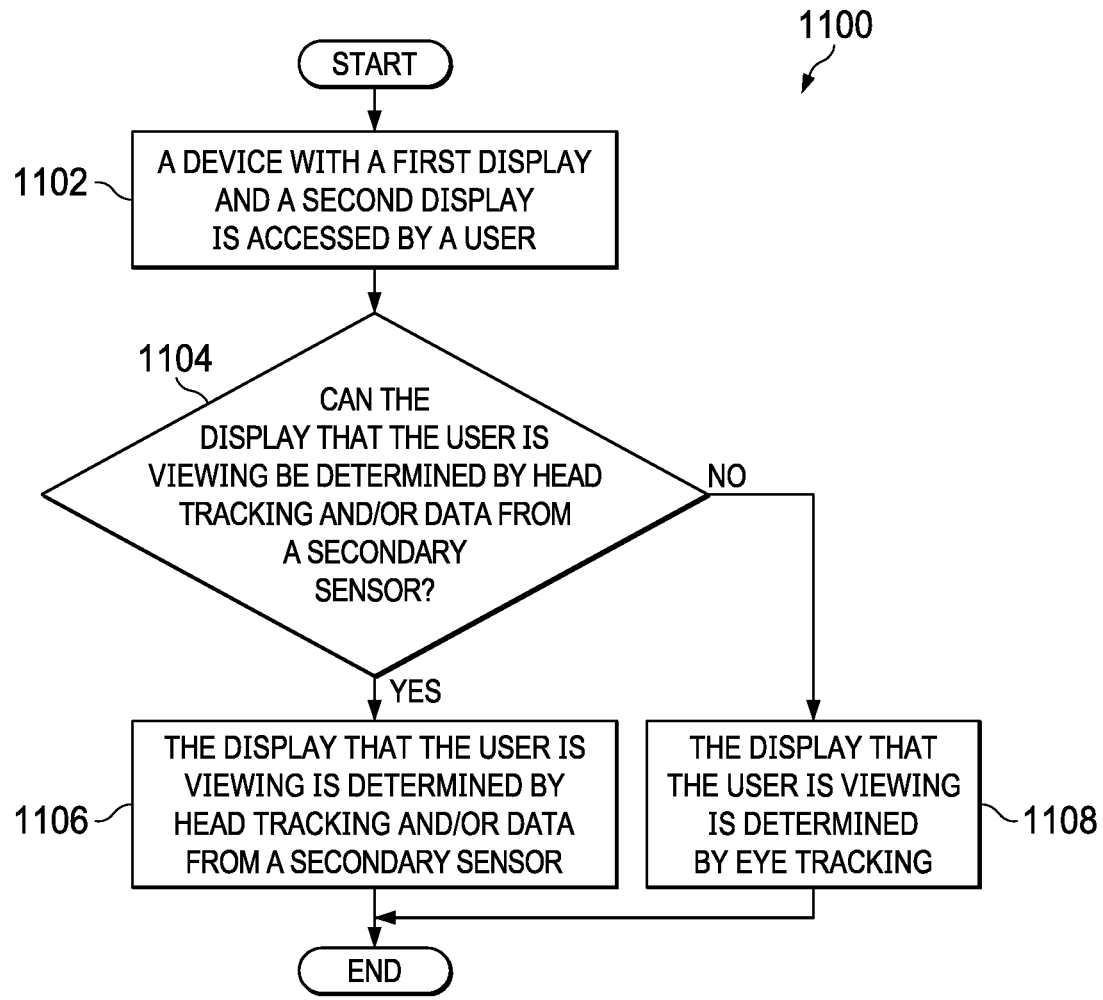
FIG. 11 is a simplified flowchart illustrating potential operations that may be associated with the system in accordance with an embodiment.

Turning to FIG. 11, FIG. 11 is an example flowchart illustrating possible operations of a flow 1100 that may be associated with enabling a system and method for dynamically reconfiguring a display in a multi-display device, in accordance with an embodiment. In an embodiment, one or more operations of flow 1100 may be performed by user tracking logic 128 or display reconfiguration engine 130. At 1102, a device with a first display and a second display is accessed by a user. At 1104, the system determines if the display the display the user is viewing can be determined by head tracking and/or data from a secondary sensor. If the display the user is viewing can be determined by head tracking and/or data from a secondary sensor, then the display the user is viewing is determined by head tracking and/or the secondary sensor, as in 1106. If the display the user is viewing cannot be determined by head tracking and/or data from the secondary sensor, then the display the user is viewing is determined by eye tracking, as in 1108. Secondary sensor 170 can received user related data from touch sensors 126a and 126b and peripheral detection engine 166 and the data can be used by user tracking logic 128 to determine the display the user is viewing or the data can be used to supplement data from head position tracking sensor 122 to determine the display the user is viewing.

Figure 12:
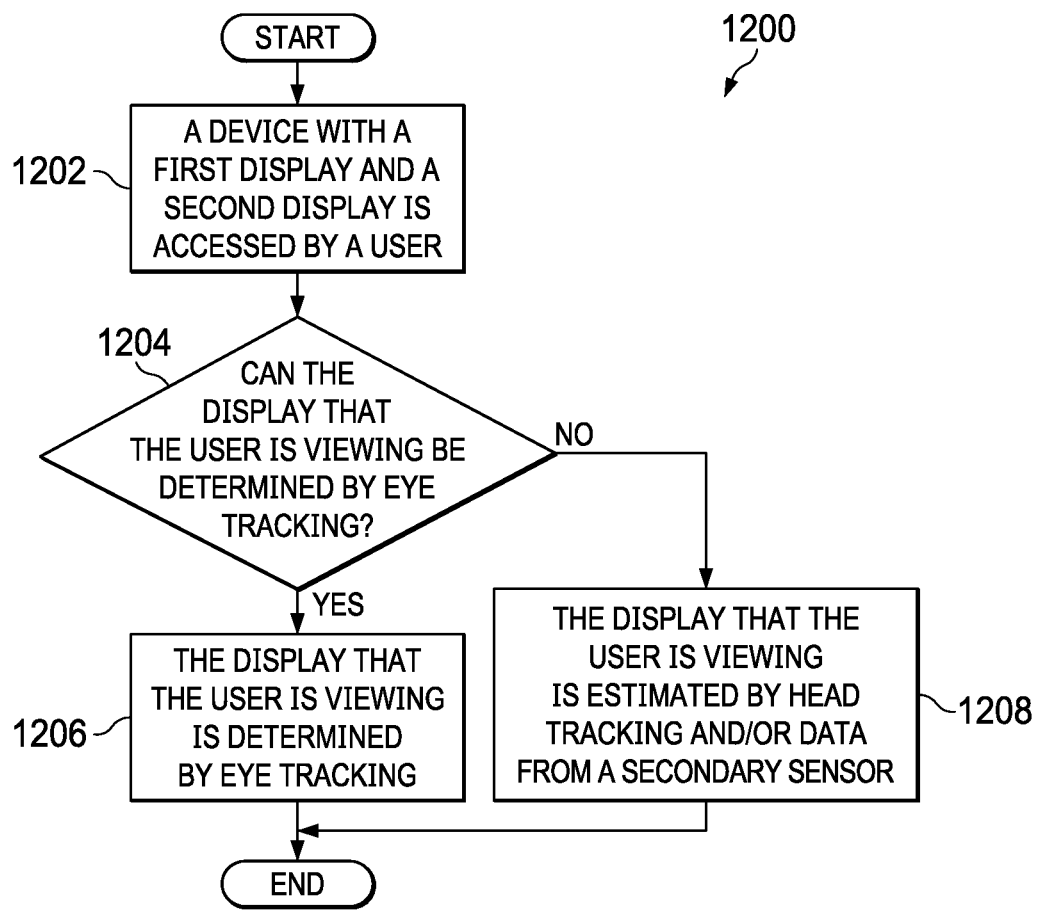
FIG. 12 is a simplified flowchart illustrating potential operations that may be associated with the system in accordance with an embodiment.

Turning to FIG. 12, FIG. 12 is an example flowchart illustrating possible operations of a flow 1200 that may be associated with enabling a system and method for dynamically reconfiguring a display in a multi-display device, in accordance with an embodiment. In an embodiment, one or more operations of flow 1200 may be performed by user tracking logic 128 or display reconfiguration engine 130. At 1202, a device with a first display and a second display is accessed by a user. At 1204, the system determines if the display the user is viewing can be determined by eye tracking. If the display the user is viewing can be determined by eye tracking, then the display the user is viewing is determined by eye tracking, as in 1206. If the display the user is viewing cannot be determined by eye tracking, then the display the user is viewing is determined by head tracking and/or data from a secondary sensor, as in 1208. Secondary sensor 170 can received user related data from touch sensors 126a and 126b and peripheral detection engine 166 and the data can be used by user tracking logic 128 to determine the display the user is viewing or the data can be used to supplement data from head position tracking sensor 122 to determine the display the user is viewing.

It is also important to note that the operations described above and in the preceding flow diagram (i.e., FIGS. 5-12) illustrate only some of the possible correlating scenarios that may be executed by, or within, electronic device 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 100 in that any suitable arrangements, chronologies, configurations, and mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic device 100 has been illustrated with reference to particular elements and operations that facilitate a system and method for dynamically reconfiguring a display in a multi-display device, these elements and operations may be replaced by any suitable architecture, protocols, and/or processes that achieve the intended functionality of electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device having at least two displays, the electronic device including a primary display housed in a first housing, a secondary display housed in a second housing, a hinge coupling the first housing to the second housing, a user facing camera housed in the first housing to capture image data of a user of the electronic device, user tracking logic to determine, based on the image data and sensor data describing a user action, that a user of the electronic device is engaged with or about to engage with the secondary display, and reconfiguration logic to reconfigure at least one of the primary display and the secondary display in response to the determination.

In Example A2, the subject matter of Example A1 can optionally include where the second housing includes at least one palm detection area to generate the sensor data to determine a presence of user's palm or palms.

In Example A3, the subject matter of any one of Examples A1-A2 can optionally include where the sensor data describes a user's interaction with a peripheral of the electronic device.

In Example A4, the subject matter of any one of Examples A1-A3 can optionally include where the peripheral is a stylus.

In Example A5, the subject matter of any one of Examples A1-A4 can optionally include where the image data describes at least one of a head position of the user and eye gaze of the user.

In Example A6, the subject matter of any one of Examples A1-A5 can optionally include where the reconfiguration logic changes a secondary display configuration to a low power configuration.

In Example A7, the subject matter of any one of Examples A1-A6 can optionally include where the reconfiguration logic reconfigures the secondary display into a keyboard user interface.

In Example A8, the subject matter of any one of Examples A1-A7 can optionally include where the camera includes a low power infrared sensor head position tracking sensor and an eye tracking system.

Example M1 is a method including receiving image data from a user facing camera of a portable electronic device having a primary display and a secondary display, receiving sensor data from at least one of i) a sensor of the portable electronic device and ii) a peripheral device wirelessly connected to the portable electronic device, determining that a user of the electronic device is actively engaged with the secondary display based on the image data and the sensor data, and reconfiguring at least one of the primary display and the secondary display in response to the determination.

In Example M2, the subject matter of Example M1 can optionally include where the secondary display is a touch display.

In Example M3, the subject matter of any one of the Examples M1-M2 can optionally include where the sensor data is generated by the touch display.

In Example M4, the subject matter of any one of the Examples M1-M3 can optionally include where the sensor data includes detection of a user's palm touching a predefined region of the touch display.

In Example M5, the subject matter of any one of the Examples M1-M3 can optionally include where the sensor data includes two user palms touching two predefined regions of the touch display.

In Example M6, the subject matter of any one of the Examples M1-M5 can optionally include where the peripheral device is a stylus and the sensor data includes a user touching the stylus.

In Example M7, the subject matter of any one of the Examples M1-M6 can optionally include where the peripheral device is a stylus and the sensor data includes a user touching the stylus and a user palm touching a predefined region of the secondary display.

In Example M8, the subject matter of any one of the Examples M1-M7 can optionally include where the sensor of the portable electronic device is disposed next to the secondary display and is configured to detect a palm rest.

In Example M9, the subject matter of any one of the Examples M1-M8 can optionally include where reconfiguring the secondary display includes reducing power consumption of the secondary display.

In Example M10, the subject matter of any one of the Examples M1-M9 can optionally include where reconfiguring the secondary display includes improving a visual appearance of the secondary display.

Example C1 is at least one machine readable storage medium having one or more instructions that when executed by at least one processor cause the at least one processor to receive image data from a user facing camera of a portable electronic device having a primary display and a secondary display, receive sensor data from at least one of i) a sensor of the portable electronic device and ii) a peripheral device wirelessly connected to the portable electronic device, determine that a user of the electronic device is actively engaged with the secondary display based on the image data and the sensor data, and reconfigure at least one of the primary display and the secondary display in response to the determination.

In Example C2, the subject matter of Example C1 can optionally include where the secondary display is a touch display and the sensor data is generated by the touch display.

Example AA1 is an apparatus including means for receiving image data from a user facing camera of a portable electronic device having a primary display and a secondary display, means for receiving sensor data from at least one of i) a sensor of the portable electronic device and ii) a peripheral device wirelessly connected to the portable electronic device, means for determining that a user of the electronic device is actively engaged with the secondary display based on the image data and the sensor data, and means for reconfiguring at least one of the primary display and the secondary display in response to the determination.

In Example AA2, the subject matter of Example AA1 can optionally include where the secondary display is a touch display.

In Example AA3, the subject matter of any one of Examples AA1-AA2 can optionally include where the sensor data is generated by the touch display.

In Example AA4, the subject matter of any one of Examples AA1-AA3 can optionally include where the sensor data includes detection of a user's palm touching a predefined region of the touch display.

In Example AA5, the subject matter of any one of Examples AA1-AA3 can optionally include where the sensor data includes two user palms touching two predefined regions of the touch display.

In Example AA6, the subject matter of any one of Examples AA1-AA5 can optionally include where the peripheral device is a stylus and the sensor data includes a user touching the stylus.

In Example AA7, the subject matter of any one of Examples AA1-AA6 can optionally include where the peripheral device is a stylus and the sensor data includes a user touching the stylus and a user palm touching a predefined region of the secondary display.

In Example AA8, the subject matter of any one of Examples AA1-AA7 can optionally include where the sensor of the portable electronic device is disposed next to the secondary display and is configured to detect a palm rest.

In Example AA9, the subject matter of any one of Examples AA1-AA8 can optionally include where reconfiguring the secondary display includes reducing power consumption of the secondary display.

In Example AA10, the subject matter of any one of Examples AA1-AA9 can optionally include where reconfiguring the secondary display includes improving a visual appearance of the secondary display.

Example X1 is a machine-readable storage medium including machine-readable instructions to implement a method or realize an apparatus as in any one of the Examples M1-M10 or AA1-AA10. Example Y1 is an apparatus comprising means for performing of any of the Example methods M1-M10. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device having at least two displays, the electronic device comprising:
   a primary display housed in a first housing;
   a secondary display housed in a second housing;
   a hinge coupling the first housing to the second housing;
   a user facing camera housed in the first housing to capture image data of a user of the electronic device;
   user tracking logic to:
      determine, based on the image data and sensor data describing a user action, that a user of the electronic device is engaged with or about to engage with the primary display or the user is engaged with or about to engage with the secondary display; and
      predict future user action based on prior user action information; and
   reconfiguration logic to dynamically reconfigure at least one of the primary display and the secondary display in response to the determination and the prediction, wherein the reconfiguration includes bringing the display that the user is not engaged with into a low power mode with a low refresh rate.

2. The electronic device of claim 1, wherein the second housing includes at least one palm detection area to generate the sensor data to determine a presence of user's palm or palms.

3. The electronic device of claim 1, wherein the sensor data describes a user's interaction with a peripheral of the electronic device.

4. The electronic device of claim 3, wherein the peripheral is a stylus.

5. The electronic device of claim 1, wherein the image data describes at least one of a head position of the user and eye gaze of the user.

6. The electronic device of claim 5, wherein the reconfiguration logic changes a secondary display configuration to the low power mode by lowering a brightens brightness and refresh rate of the secondary display.

7. The electronic device of claim 1, wherein the reconfiguration logic reconfigures the secondary display into a keyboard user interface.

8. The electronic device of claim 1, wherein the camera includes a low power infrared sensor head position tracking sensor and an eye tracking system.

9. A method comprising:
   receiving image data from a user facing camera of a portable electronic device having a primary display and a secondary display;
   receiving sensor data from at least one of i) a sensor of the portable electronic device and ii) a peripheral device wirelessly connected to the portable electronic device;

determining, based on the image data and the sensor data, that a user of the electronic device is actively engaged with the primary display or is actively engaged with the secondary display;

predicting future user action based on prior user action information; and dynamically reconfiguring at least one of the primary display and the secondary display in response to the determination and the prediction, wherein the reconfiguration includes bringing the display that the user is not engaged with into a low power mode with a low refresh rate.

10. The method of claim 9, wherein the secondary display is a touch display.

11. The method of claim 10, wherein the sensor data is generated by the touch display.

12. The method of claim 11, wherein the sensor data includes detection of a user's palm touching a predefined region of the touch display.

13. The method of claim 11, wherein the sensor data includes two user palms touching two predefined regions of the touch display.

14. The method of claim 9, wherein the peripheral device is a stylus and the sensor data includes a user touching the stylus.

15. The method of claim 9, wherein the peripheral device is a stylus and the sensor data includes a user touching the stylus and a user palm touching a predefined region of the secondary display.

16. The method of claim 9, wherein the sensor of the portable electronic device is disposed next to the secondary display and is configured to detect a palm rest.

17. The method of claim 9, wherein the reconfiguration includes reducing power consumption of the display the use is not engaged with.

18. The method of claim 9, wherein reconfiguring the secondary display includes improving a visual appearance of the secondary display.

19. At least one non-transitory machine readable medium comprising one or more instructions that, when executed by at least one processor, causes the at least one processor to:

receive image data from a user facing camera of a portable electronic device having a primary display and a secondary display;

receive sensor data from at least one of i) a sensor of the portable electronic device and ii) a peripheral device wirelessly connected to the portable electronic device;

determine, based on the image data and the sensor data, that a user of the electronic device is actively engaged with the primary display or is actively engaged with the secondary display;

predict future user action based on prior user action information; and dynamically reconfigure at least one of the primary display and the secondary display in response to the determination and the prediction, wherein the reconfiguration includes bringing the display that the user is not engaged with into a low power mode with a low refresh rate.

20. The at least one non-transitory machine readable medium of claim 19, wherein the secondary display is a touch display and the sensor data is generated by the touch display.

* * * * *